United States Patent
Wu et al.

(10) Patent No.: US 11,558,783 B2
(45) Date of Patent: Jan. 17, 2023

(54) COMMUNICATION METHOD, NETWORK ELEMENT, TERMINAL APPARATUS, AND SYSTEM

(71) Applicant: HUAWEI TECHNOLOGIES CO., LTD., Guangdong (CN)

(72) Inventors: Yizhuang Wu, Beijing (CN); Chunshan Xiong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 57 days.

(21) Appl. No.: 16/864,385

(22) Filed: May 1, 2020

(65) Prior Publication Data

US 2020/0260336 A1    Aug. 13, 2020

Related U.S. Application Data

(63) Continuation of application No. PCT/CN2018/113435, filed on Nov. 1, 2018.

(30) Foreign Application Priority Data

Nov. 3, 2017   (CN) .......................... 201711069131.5

(51) Int. Cl.
*H04W 36/14* (2009.01)
*H04W 36/00* (2009.01)
(Continued)

(52) U.S. Cl.
CPC ....... *H04W 28/24* (2013.01); *H04W 28/0268* (2013.01); *H04W 36/0022* (2013.01); *H04W 36/0033* (2013.01); *H04W 36/14* (2013.01)

(58) Field of Classification Search
CPC ............. H04W 28/0268; H04W 28/24; H04W 36/0022; H04W 36/0033; H04W 36/0044; H04W 36/14
See application file for complete search history.

(56) References Cited

U.S. PATENT DOCUMENTS 10,869,244 B2 * 12/2020 Kim ...................... H04W 36/34
10,993,139 B2 *  4/2021 Ahmad ............. H04W 36/0044
(Continued)

FOREIGN PATENT DOCUMENTS

CN    104956702 A    9/2015
CN    106465080 A    2/2017
(Continued)

OTHER PUBLICATIONS

China Mobile et al., "Clarifications for HO procedure from 5GS to EPC with SR UE using N26," SA WG2 Meeting #122bis, S2-175483, Sophia Antipolis, France, Aug. 21-25, 2017, 19 pages.
(Continued)

*Primary Examiner* — Ahmed Elallam

(74) *Attorney, Agent, or Firm* — Fish & Richardson P.C.

(57) ABSTRACT

Example communication methods and apparatus are described. One example communication method includes receiving first indication information by a first network element from a second network element, where the first indication information is used to indicate that a current condition supports establishment of a session of a first network for a terminal apparatus. The first network element obtains first quality of service (QoS) control information of a first session of the terminal apparatus after receiving the first indication information, where the first session is a session established by the terminal apparatus by using a second network. The first network element sends the first QoS control information to the second network element.

15 Claims, 12 Drawing Sheets

(51) Int. Cl.
  *H04W 28/02* (2009.01)
  *H04W 28/24* (2009.01)

(56) References Cited

U.S. PATENT DOCUMENTS

| | | | |
|---|---|---|---|
| 11,012,895 B2* | 5/2021 | Wang | H04W 28/24 |
| 11,019,538 B2* | 5/2021 | Stojanovski | H04W 76/50 |
| 11,102,625 B2* | 8/2021 | Kim | H04W 48/16 |
| 11,159,933 B2* | 10/2021 | Zong | H04W 36/0077 |
| 11,323,386 B2* | 5/2022 | Dannebro | H04W 28/10 |
| 11,375,396 B2* | 6/2022 | Xin | H04W 28/0268 |
| 2017/0265206 A1 | 9/2017 | Andreoli-Fang et al. | |
| 2020/0229199 A1* | 7/2020 | Xin | H04W 76/32 |
| 2020/0275331 A1* | 8/2020 | Kim | H04W 36/00 |
| 2021/0195490 A1* | 6/2021 | Rommer | H04W 36/14 |

FOREIGN PATENT DOCUMENTS

| | | | |
|---|---|---|---|
| CN | 109391932 A * | 2/2019 | |
| ES | 2397824 T3 | 3/2013 | |

OTHER PUBLICATIONS

Catt, "TS 23.502: Handover procedure from 5GS to EPS for dual registration mode," SA WG2 Meeting #121, S2-173223, Hangzhou, China, May 15-19, 2017, 4 pages.
3GPP TS 23.502 V1.2.0 (Sep. 2017), 3rd Generation Partnership Project; Technical Specification Group Services and System Aspects; Procedures for the 5G System; Stage 2 (Release 15), 165 pages.
Huawei, "23.502 Update of SGS to EPS handover using N26 interface," SA WG2 Meeting #123, S2-177937, Ljubljana, Slovenia, Oct. 23-27, 2017, 5 pages.
3GPP TS 29.502 V0.1.0 (Oct. 2017), "3rd Generation Partnership Project; Technical Specification Group Core Network and Terminals; 5G System; Session Management Services Stage 3 (Release 15)," Oct. 2017, 18 pages.
3GPP TS 23.501 V1.4.0 (Sep. 2017), "3rd Generation Partnership Project; Technical Specification Group Services and System Aspects; System Architecture for the 5G System; Stage 2 (Release 15)," Sep. 2017, 151 pages.
Office Action issued in Chinese Application No. 201711069131.5 dated Jan. 7, 2020, 21 pages (with English translation).
PCT International Search Report and Written Opinion issued in International Application No. PCT/CN2018/113435 dated Jan. 30, 2019, 17 pages (with English translation).
3GPP TR 24.890 V1.0.3 (Sep. 2017), "3rd Generation Partnership Project; Technical Specification Group Core Network and Terminals; 5G System—Phase 1; CT WG1 Aspects (Release 15)," Sep. 2017, 164 pages.
3GPP TR 32.899 V1.1.0 (Oct. 2017), 3rd Generation Partnership Project; Technical Specification Group Services and System Aspects; Telecommunication management; Charging management;Study on charging aspects of 5G system architecture Phase 1(Release 15), Oct. 2017, 86 pages.
Extended European Search Report issued in European Application No. 18874016.1 dated Nov. 23, 2020, 13 pages.
Kddi, "23.502: The treatment of GBR 008 Flows in N2 Release procedure," SA WG2 Meeting #123, S2-178044, Ljubljana, Slovenia, Oct. 23-27, 2017, 8 pages.
NTT Docomo et al., "TS 23.502: NX-based Handover procedure," SA WG2 Meeting #119, S2-171590, Dubrovnik, Croatia, Feb. 13-17, 2017, 4 pages.
Qualcomm Incorporated et al., "TS 23.502: Network sharing in NG HAN (01#25)," SA WG2 Meeting #123, S2-178037, Ljubljana, Slovenia, Oct. 23-27, 2017, 24 pages.
Office Action issued in Indian Application No. 202037020426 dated Jul. 8, 2021, 6 pages.

* cited by examiner

COMMUNICATION METHOD, NETWORK ELEMENT, TERMINAL APPARATUS, AND SYSTEM

CROSS-REFERENCE TO RELATED APPLICATIONS

This application is a continuation of International Application No. PCT/CN2018/113435, filed on Nov. 1, 2018, which claims priority to Chinese Patent Application No. 201711069131.5, filed on Nov. 3, 2017. The disclosures of the aforementioned applications are hereby incorporated by reference in their entireties.

TECHNICAL FIELD

This application relates to the communications field, and more specifically, to a communication method, a network element, a terminal apparatus, and a system.

BACKGROUND

In network construction of a future fifth generation (5G) communications system, there will be a network architecture in which a plurality of network systems interwork with each other. For example, the interworking network architecture may include a 5G system and an evolved packet system (EPS), and a communications interface exists between the 5G system and the EPS to perform interoperations between communications systems. When a terminal accesses a network, the network may simultaneously establish contexts in a plurality of communications systems for the terminal. For example, both a context in a 5G system and a context in an EPS are established. However, in actual communication, a context established in a communications system may not be used. Therefore, the establishment of the contexts for the plurality of communications systems reduces utilization of communications resources and increases system overheads.

SUMMARY

This application provides a communication method, a network element, a terminal apparatus, and a system to improve communication efficiency.

According to a first aspect, a communication method is provided. The method includes: receiving, by a first network element, first indication information from a second network element, where the first indication information is used to indicate that a current condition supports establishment of a session of a first network for a terminal apparatus; obtaining, by the first network element, first quality of service QoS control information of a first session of the terminal apparatus after receiving the first indication information, where the first session is a session established by the terminal apparatus by using a second network, and sending, by the first network element, the first QoS control information to the second network element.

In this embodiment of this application, based on an interworking architecture between the first network and the second network, when a condition indicated by the first indication information is met, the session of the first network of the first session may be established while a session of the second network of the first session is established. Therefore, establishment of the session of the first network of the first session can be determined based on the current condition, thereby avoiding establishment of an unnecessary session of the first network, and improving communication efficiency.

In a possible implementation, the first indication information includes first information, and the first information is used to indicate that the current condition is that a communications interface exists between a mobility management entity of the second network and a mobility management entity of the first network.

In this embodiment of this application, the first network element determines, based on the first information included in the first indication information, to obtain the first quality of service QoS control information of the first session of the terminal apparatus in the first network, and determines, based on the first indication information, to establish the session of the first network, thereby avoiding establishment of an unnecessary session of the first network and improving communication efficiency.

In a possible implementation, the first information includes a default bearer identifier of the first network of the terminal apparatus.

In this embodiment of this application, the default bearer identifier of the first network of the terminal apparatus is carried in the first information, to implicitly indicate content of the first information, thereby reducing overheads.

In a possible implementation, the first indication information further includes second information, and the second information is used to indicate that the current condition is that the terminal apparatus is in a single registration state.

In this embodiment of this application, the first indication information includes the first information and the second information. When the condition indicated by the first indication information is met, the session of the first network of the first session may be established while the session of the second network of the first session is established, thereby avoiding establishment of an unnecessary session of the first network and improving communication efficiency.

In a possible implementation, the method further includes: obtaining, by the first network element, third information, where the third information is used to indicate that an attribute of the first session is to ensure continuity; and after receiving the first indication information, the obtaining, by the first network element, first QoS control information of the terminal apparatus includes: obtaining, by the first network element, the first QoS control information after obtaining the first indication information and the third information.

In this embodiment of this application, when a network requirement indicated by the first indication information and a condition indicated by the third information are met, the session of the first network of the first session may be established while the session of the second network of the first session is established, thereby avoiding establishment of an unnecessary session of the first network and improving communication efficiency.

In a possible implementation, the obtaining, by the first network element, first QoS control information of the terminal apparatus includes: sending, by the first network element, a subscription data obtaining request message of the first session to a third network element, where the subscription data obtaining request message includes fourth information, and the fourth information is used to request to provide subscription data of the first network; receiving, by the first network element, a subscription data response message of the first session from the third network element, where the subscription data response message includes second QoS control information, and the second QoS control information is the subscription data of the first network that the fourth information requests to provide.

In a possible implementation, the obtaining, by the first network element, the first QoS control information based on the second QoS control information includes: determining, by the first network element, the second QoS information as the first QoS control information; or sending, by the first network element, the second QoS control information to a policy control network element; and receiving, by the first network element, the first QoS control information from the policy control network element, where the first QoS control information is based on the second QoS control information, and the first QoS control information is information authorized by the policy control network element.

In a possible implementation, the fourth information includes an access point name APN of the first network.

In a possible implementation, the obtaining, by the first network element, first QoS control information of the terminal apparatus includes: receiving, by the first network element, the first QoS control information from a policy control network element, where the first QoS control information is authorized information.

In a possible implementation, the method further includes: sending, by the first network element, an establishment request message of the first session to the policy control network element, where the establishment request message of the first session includes fifth information, and the fifth information is used to instruct the policy control network element to establish the session of the first network; and the receiving, by the first network element, the first QoS control information from a policy control network element includes: receiving, by the first network element, an establishment response message of the first session from the policy control network element, where the establishment response message of the first session includes the first QoS control information.

In a possible implementation, the first QoS control information includes at least one of the following: a QoS parameter, an identifier of the QoS parameter, a packet filter, and priority information of the packet filter.

In a possible implementation, the receiving, by a first network element, first indication information from a second network element includes: receiving, by the first network element, a management request message of the first session from the second network element, where the management request message of the first session includes the first indication information.

In a possible implementation, the first QoS control information is carried in a first session management message, and the first session management message is used to instruct to modify or establish QoS control information in the first network of the terminal apparatus.

According to a second aspect, a communication method is provided. The method includes: sending, by a second network element, first indication information to a first network element, where the first indication information is used to indicate that a current condition supports establishment of a session of a first network for a terminal apparatus; and receiving, by the second network element, first quality of service QoS control information of a first session of the terminal apparatus from the first network element, where the first session is a session established by the terminal apparatus by using a second network.

In this embodiment of this application, based on an interworking architecture between the first network and the second network, when a condition indicated by the first indication information is met, the session of the first network of the first session may be established while a session of the second network of the first session is established. Therefore, establishment of the session of the first network of the first session can be determined based on the current condition, thereby avoiding establishment of an unnecessary session of the first network, and improving communication efficiency.

In a possible implementation, the method further includes: receiving, by the second network element, second indication information from the terminal apparatus, where the second indication information is used to indicate that the current condition supports establishment of the session of the first network for the terminal apparatus; and determining, by the second network element, the first indication information based on the second indication information.

In a possible implementation, the first indication information includes first information, and the first information is used to indicate that the current condition is that a communications interface exists between a mobility management entity of the second network and a mobility management entity of the first network.

In a possible implementation, the first information includes a default bearer identifier of the first network of the terminal apparatus.

In a possible implementation, the first indication information further includes second information, and the second information is used to indicate that the current condition is that the terminal apparatus is in a single registration state.

In a possible implementation, the first QoS control information includes at least one of the following: a QoS parameter, an identifier of the QoS parameter, a packet filter, and priority information of the packet filter.

In a possible implementation, the sending, by a second network element, first indication information to a first network element includes: sending, by the second network element, a management request message of the first session to the first network element, where the management request message of the first session includes the first indication information.

In a possible implementation, the first QoS control information is carried in a first session management message, and the first session management message is used to instruct to modify or establish QoS control information in the first network of the terminal apparatus.

According to a third aspect, a communication method is provided. The method includes: sending, by a terminal apparatus, second indication information to a second network element, where the second indication information is used to indicate that a current condition supports establishment of a session of a first network for the terminal apparatus; and receiving, by the terminal apparatus, first quality of service QoS control information of a first session of the terminal apparatus, where the first session is a session established by the terminal apparatus by using a second network.

In this embodiment of this application, the terminal apparatus sends the second indication information to the second network element, to indicate that the current condition supports establishment of the session of the first network for the terminal apparatus, so that the second network element determines the first indication information based on the second indication information. Therefore, a network side can determine, based on the current condition, to establish the session of the first network of the first session, thereby avoiding establishment of an unnecessary session of the first network, and improving communication efficiency.

In a possible implementation, the second indication information includes first information, and the first information is used to indicate that the current condition is that a communications interface exists between a mobility management entity of the second network and a mobility management entity of the first network.

In a possible implementation, the first information includes a default bearer identifier of the first network of the terminal apparatus.

In a possible implementation, the second indication information further includes second information, and the second information is used to indicate that the current condition is that the terminal apparatus is in a single registration state.

In a possible implementation, the first QoS control information includes at least one of the following: a QoS parameter, an identifier of the QoS parameter, a packet filter, and priority information of the packet filter.

In a possible implementation, the first QoS control information is carried in a second session management message, and the second session management message is used to instruct to modify or establish QoS control information in the first network of the terminal apparatus.

According to a fourth aspect, a network element is provided. The network element includes: a receiving unit, configured to receive first indication information from a second network element, where the first indication information is used to indicate that a current condition supports establishment of a session of a first network for a terminal apparatus: an obtaining unit, configured to obtain first quality of service QoS control information of a first session of the terminal apparatus after receiving the first indication information, where the first session is a session established by the terminal apparatus by using a second network; and a sending unit, configured to send the first QoS control information to the second network element.

In a possible implementation, the first indication information includes first information, and the first information is used to indicate that the current condition is that a communications interface exists between a mobility management entity of the second network and a mobility management entity of the first network.

In a possible implementation, the first information includes a default bearer identifier of the first network of the terminal apparatus.

In a possible implementation, the first indication information further includes second information, and the second information is used to indicate that the current condition is that the terminal apparatus is in a single registration state.

In a possible implementation, the obtaining unit is further configured to obtain third information, where the third information is used to indicate that an attribute of the first session is to ensure continuity; and in terms of obtaining the first QoS control information of the terminal apparatus after receiving the first indication information, the obtaining unit is specifically configured to obtain the first QoS control information after obtaining the first indication information and the third information.

In a possible implementation, in terms of obtaining the first QoS control information of the terminal apparatus, the obtaining unit is specifically configured to: send a subscription data obtaining request message of the first session to a third network element, where the subscription data obtaining request message includes fourth information, and the fourth information is used to request to provide subscription data of the first network: receive a subscription data response message of the first session from the third network element, where the subscription data response message includes second QoS control information of the first network, and the second QoS control information is the subscription data of the first network that the fourth information requests to provide.

In a possible implementation, in terms of obtaining the first QoS control information based on the second QoS control information, the obtaining unit is specifically configured to: determine the second QoS control information as the first QoS control information; or send the second QoS control information to a policy control network element; and receive the first QoS control information from the policy control network element, where the first QoS control information is based on the second QoS control information, and the first QoS control information is information authorized by the policy control network element.

In a possible implementation, the fourth information includes an access point name APN of the first network.

In a possible implementation, in terms of obtaining the first QoS control information of the terminal apparatus, the obtaining unit is specifically configured to receive the first QoS control information from a policy control network element, where the first QoS control information is information authorized by the policy control network element.

In a possible implementation, the sending unit is further configured to send an establishment request message of the first session to the policy control network element, where the establishment request message of the first session includes fifth information, and the fifth information is used to instruct the policy control network element to establish the session of the first network: and in terms of receiving the first QoS control information from the policy control network element, the obtaining unit is specifically configured to receive an establishment response message of the first session from the policy control network element, where the establishment response message of the first session includes the first QoS control information.

In a possible implementation, the first QoS control information includes at least one of the following: a QoS parameter, an identifier of the QoS parameter, a packet filter, and priority information of the packet filter.

In a possible implementation, in terms of receiving the first indication information from the second network element, the receiving unit is specifically configured to receive a management request message of the first session from the second network element, where the management request message of the first session includes the first indication information.

In a possible implementation, the first QoS control information is carried in a first session management message, and the first session management message is used to instruct to modify or establish QoS control information in the first network of the terminal apparatus.

According to a fifth aspect, a network element is provided. The network element includes: a sending unit, configured to send first indication information to a first network element, where the first indication information is used to indicate that a current condition supports establishment of a session of a first network for a terminal apparatus; and a receiving unit, configured to receive first quality of service QoS control information of a first session of the terminal apparatus from the first network element, where the first session is a session established by the terminal apparatus by using a second network.

In a possible implementation, the receiving unit is further configured to receive second indication information from the terminal apparatus, where the second indication information is used to indicate that the current condition supports establishment of the session of the first network for the terminal apparatus; and the network element further includes a determining unit, configured to determine the first indication information based on the second indication information.

In a possible implementation, the first indication information includes first information, and the first information is used to indicate that the current condition is that a communications interface exists between a mobility management entity of the second network and a mobility management entity of the first network.

In a possible implementation, the first information includes a default bearer identifier of the first network of the terminal apparatus.

In a possible implementation, the first indication information further includes second information, and the second information is used to indicate that the current condition is that the terminal apparatus is in a single registration state.

In a possible implementation, the first QoS control information includes at least one of the following: a QoS parameter, an identifier of the QoS parameter, a packet filter, and priority information of the packet filter.

In a possible implementation, in terms of sending the first indication information to the first network element, the sending unit is specifically configured to send a management request message of the first session to the first network element, where the management request message of the first session includes the first indication information.

In a possible implementation, the first QoS control information is carried in a first session management message, and the first session management message is used to instruct to modify or establish QoS control information in the first network of the terminal apparatus.

According to a sixth aspect, a terminal apparatus is provided. The terminal apparatus includes: a sending unit, configured to send second indication information to a second network element, where the second indication information is used to indicate that a current condition supports establishment of a session of a first network for the terminal apparatus; and a receiving unit, configured to receive first quality of service QoS control information of a first session of the terminal apparatus, where the first session is a session established by the terminal apparatus by using a second network.

In a possible implementation, the second indication information includes first information, and the first information is used to indicate that the current condition is that a communications interface exists between a mobility management entity of the second network and a mobility management entity of the first network.

In a possible implementation, the first information includes a default bearer identifier of the first network of the terminal apparatus.

In a possible implementation, the second indication information further includes second information, and the second information is used to indicate that the current condition is that the terminal apparatus is in a single registration state.

In a possible implementation, the first QoS control information includes at least one of the following: a QoS parameter, an identifier of the QoS parameter, a packet filter, and priority information of the packet filter.

In a possible implementation, the first QoS control information is carried in a second session management message, and the second session management message is used to instruct to modify or establish QoS control information in the first network of the terminal apparatus.

According to a seventh aspect, a communications system is provided. The communications system includes the network element according to the fourth aspect or the fifth aspect. Optionally, the communications system may further include the terminal apparatus according to the sixth aspect.

According to an eighth aspect, a network element is provided. The network element includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method according to any one of the first aspect or the possible implementations of the first aspect.

According to a ninth aspect, a network element is provided. The network element includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method according to any one of the second aspect or the possible implementations of the second aspect.

According to a tenth aspect, a terminal apparatus is provided. The terminal apparatus includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the execution enables the processor to perform the method according to the third aspect or any possible implementation of the third aspect.

According to an eleventh aspect, a communications system is provided. The communications system includes the network element according to the eighth aspect or the ninth aspect. Optionally, the communications system may further include the terminal apparatus according to the tenth aspect.

According to a twelfth aspect, a computer-readable medium is provided. The computer-readable medium is configured to store a computer program. The computer program includes an instruction used to perform the method according to any one of the first aspect or the possible implementations of the first aspect.

According to a thirteenth aspect, a computer-readable medium is provided. The computer-readable medium is configured to store a computer program. The computer program includes an instruction used to perform the method according to any one of the second aspect or the possible implementations of the second aspect.

According to a fourteenth aspect, a computer-readable medium is provided. The computer-readable medium is configured to store a computer program. The computer program includes an instruction used to perform the method according to any one of the third aspect or the possible implementations of the third aspect.

DESCRIPTION OF EMBODIMENTS

Figure 1:
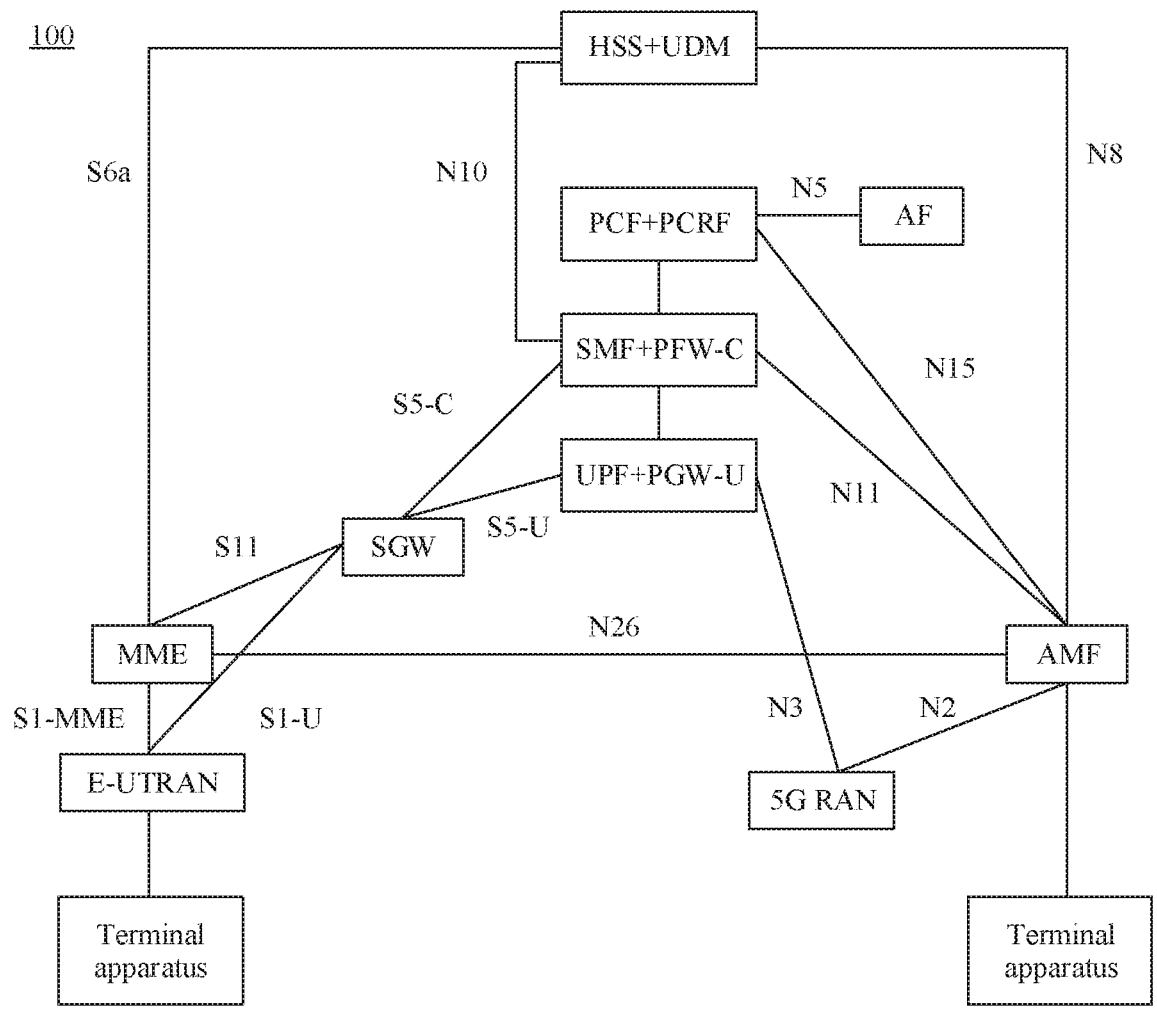
FIG. 1 is a schematic diagram of a possible application environment according to an embodiment of this application.

The following describes the technical solutions of this application with reference to the accompanying drawings.

The technical solutions in the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, an evolved packet system (EPS), a future 5th generation (5G) system, or a new radio (NR) system.

A terminal apparatus in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal apparatus may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal apparatus in a future 5G network, a terminal apparatus in a future evolved public land mobile network (PLMN), or the like. This is not limited in the embodiments of this application.

A base station in the embodiments of this application may be a device configured to communicate with a terminal apparatus. The base station may be a base transceiver station (BTS) in a global system for mobile communications (GSM) or a code division multiple access (CDMA) system, or may be a NodeB (NB) in a wideband code division multiple access (Wideband Code Division Multiple Access, WCDMA) system, or may be an evolved NodeB (eNB or eNodeB) in an LTE system, or may be a radio controller in a cloud radio access network (CRAN) scenario, or the like. This is not limited in this embodiment of this application.

A network element in this embodiment of this application may include a network device in a 5G system architecture and/or a network device in a 4G system architecture. The 4G system architecture may include an EPS architecture. For example, the network element may include an access and mobility management function (AMF) entity, a mobility management entity (MME), a session management function (SMF) entity, a unified data management (UDM) entity, a policy control function (PCF) entity, a policy and charging rule function (PCRF) entity, a packet data network (PDN), a packet data unit (PDU), a control plane gateway (PGW-C), a user plane gateway (PGW-U), a home subscriber server (HSS), an application function (AF) entity, and the like.

For ease of understanding, related terms in the embodiments of this application are described first.

A quality of service (QoS) flow is a minimum QoS forwarding processing granularity in a 5G system, and all services mapped to a same QoS flow receive same forwarding processing, such as a packet loss rate and a packet delay budget. Different QoS forwarding processing requires different 5G QoS flows.

Figure 2:
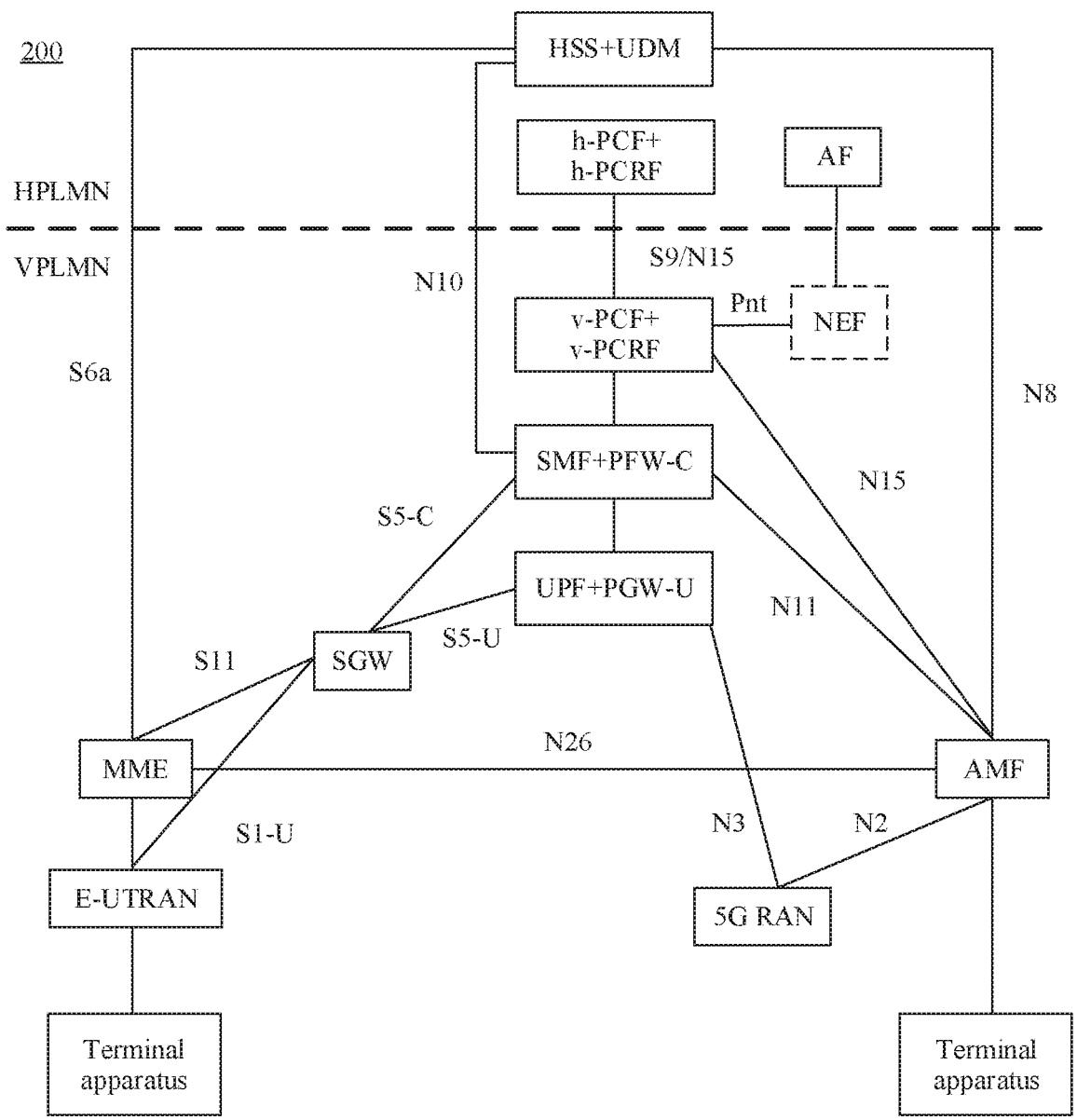
FIG. 2 is a schematic diagram of a possible application environment according to another embodiment of this application.
Figure 3:
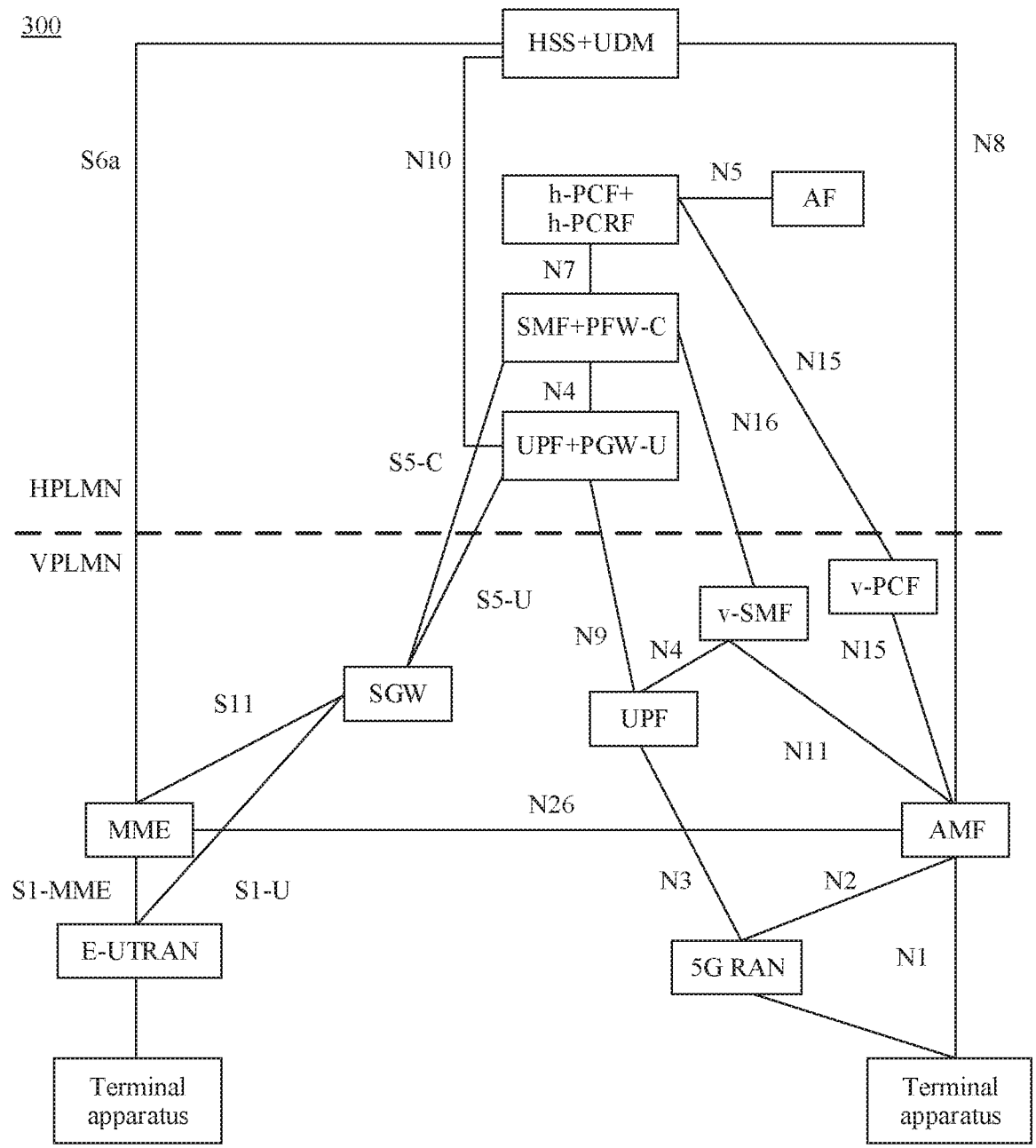
FIG. 3 is a schematic diagram of a possible application environment according to another embodiment of this application.

The following describes an application environment of the embodiments of this application with reference to FIG. 1 to FIG. 3. FIG. 1 to FIG. 3 are respectively schematic diagrams of possible system architectures 100 to 300 according to embodiments of this application. FIG. 1 shows the interworking architecture 100 between a 5G system and an EPS in a non-roaming scenario. FIG. 2 shows the interworking architecture 200 between a 5G system and an EPS in a local breakout roaming scenario. FIG. 3 shows the interworking architecture 300 between a 5G system and an EPS in a home-routed or home-routed roaming scenario.

In the architectures 100 to 300, a first interface is introduced to support interworking between the 5G system and the EPS. The first interface is a communications interface between a mobility management entity of the 5G system and a mobility management entity of the EPS. The mobility management entity of the 5G system may be an AMF, and the mobility management entity of the EPS may be an MME. In the embodiments of this application, the first interface may be denoted as an N26 interface. When the system architecture supports the N26 interface, the interworking architecture can support handover between the 5G system and the EPS. It should be noted that, in the interworking architecture, support for the N26 interface is optional, and a handover procedure can be used to ensure service continuity only in an interworking network that supports the N26 interface.

Specifically, the architectures 100 to 300 may include a network element in the EPS and a network element in the 5G system. Some modules, such as an HSS+UDM module, a PCF+PCRF module, an SMF+PGW-C module, and a UPF+PGW-U module, in the architectures 100 to 300 include functions of the network element in the EPS and the network element in the 5G system. The following describes modules and communications interfaces in the architectures 100 to 300.

The UPF+PGW-U module is used for transmission management of user data. In the interworking architecture, the module can not only be used for EPS data transmission, but also provide a 5G data transmission function.

The SMF+PGW-C module is used for session establishment, deletion, and modification management. In the interworking architecture, the module can provide both an EPS session management function and a 5G session management function.

The PCF+PCRF module is used by a policy and charging control entity. In the interworking architecture, the module can provide a terminal apparatus with both EPS policy and charging control information and 5G policy and charging control information.

The HSS+UDM module is configured to store subscription data of a user. In the interworking architecture, the module stores both EPS subscription information of the terminal apparatus and 5G subscription information of the terminal apparatus.

A 5G radio access network (RAN) provides a radio air interface for the terminal apparatus to access a core network, to obtain a corresponding service.

An application function (AF) interacts with the core network and provides a service or a service, supports an access capability exposure function, interacts with a policy architecture and provides application information, and the like.

An N5 interface is an interface between the PCF and the AF and is used by the AF to directly interact with the PCF to transmit service-related information.

A network exposure function (NEF) is a service and a capability that are provided by a secure and open network function and supports the AF to interact with an internal network by using the NEF.

A Pnt interface is an interface between the PCF and the NEF, and is used for interaction between the NEF and the PCF. A third-party AF can interact with the PCF through the NEF.

An evolved universal terrestrial radio access network (E-UTRAN) is configured to perform radio resource management, establish, modify, or delete an air interface resource for the terminal apparatus, and provide transmission of data, signaling, and the like for the terminal apparatus.

An AMF module is used for access and mobility management of a user, mainly including registration management, accessibility management, mobility management, paging management, access authentication and authorization, encryption and integrity protection of non-access stratum signaling, and the like of the user.

An MME module is used for mobility management of a user, mainly including, for example, attachment management, accessibility management, mobility management, paging management, access authentication and authorization, and encryption and integrity protection of non-access stratum signaling of the user.

An SGW module is a termination point of a user plane gateway and a user plane of the E-UTRAN, and serves as a local mobility anchor for handover between base stations. The SGW module manages data packet routing and transmission, adds a packet tag of a transport layer, and the like.

An S1-MME interface is a control plane interface between the MME and the E-UTRAN.

An S1-U interface is a user-plane interface between the S-GW and the E-UTRAN.

An S5-U interface is a user plane interface between the SGW and the PGW-U, and is configured to transmit user plane data of UE.

An S5-C interface is a control plane management interface between the SGW and the PGW-U, and is configured to establish a user plane connection between the SGW and the PGW-U for UE.

An S6a interface is an interface between the MME and the HSS, and is configured to obtain subscription data of a user and perform an authentication and authorization function for UE.

An S11 interface is an interface between the SGW and the MME, and is configured to establish a user plane bearer.

An N1 interface is an interface between UE and the AMF, and is used for signaling management and transmission at a non-access stratum of a user.

An N2 interface is an interface between a (R)AN and the AMF, and is used for signaling transmission.

An N3 interface is an interface between the UPF and the (R)AN and is configured to transmit user data.

An N4 interface is an interface between the SMF and the UPF, and is configured to establish a user plane transmission channel.

An N7 interface is an interface between the SMF and the PCF, and is configured to work out and deliver policy control and charging information.

An N8 interface is an interface between the AMF and the UDM, and is configured to obtain mobility-related subscription information of a user and the like.

An N10 interface is an interface between the SMF and the UDM, and is configured to obtain session management-related subscription information of a user and the like.

An N11 interface is an interface between the SMF and the AMF, and is configured to transmit session management information and the like.

An N15 interface is an interface between the AMF and the PCF, and is configured to obtain access and mobility-related policy information.

In addition, in the architecture 200:

h-PCF+h-PCRF represents a policy control entity that supports interworking in a home network or a home network, and supports providing a 4G function such as policy and charging control, and supports providing a 5G function such as policy and charging control.

An S9/N15 interface is an interface between PCFs in a home network or a home network.

In the architecture 300:

v-PCF+v-PCRF represents a policy control entity that supports interworking in a roaming network or a visited network, and supports providing a 4G function such as policy and charging control, and supports providing a 5G function such as policy and charging control.

A v-SMF indicates an SMF in a roaming network.

A v-PCF indicates a PCF in a roaming network.

In addition, an HPLMN in FIG. 2 and FIG. 3 represents a local network, and a VPLMN represents an access network or a roaming network. For example, an HPLMN represents a (home) public land mobile network (HPLMN), and a VPLMN represents a visited (visit) or roaming PLMN.

It may be understood that the foregoing descriptions of functions of various modules are merely examples, and the modules may further have other functions. This is not limited in the embodiments of the present application.

In some embodiments, in a process of an interoperation between the 5G system and the EPS, when the terminal apparatus is in an idle state, the terminal apparatus may access the EPS in a tracking area update (TAU) manner. When the terminal apparatus is in a connected state, a handover procedure between the 5G system and the EPS mainly includes the following two manners: In a first manner, in a process of an interoperation between the 5G system and the EPS, mobility management/session management (Mobility Management/Session Management, MM/SM) context mapping is performed on each other; in a second manner, a solution of re-establishing an MMiSM context in an EPS-to-5G handover process is supported.

In some embodiments, a procedure of handing over from the 5G system to the EPS specifically includes: When a 5G QoS flow is established in the 5G network, both an EPS QoS parameter and an EPS bearer identifier (ID) are established. The establishing an EPS QoS parameter and an EPS bearer identifier includes: establishing a default EPS bearer of QoS corresponding to a default 5G rule, and may further include: establishing a dedicated EPS bearer corresponding to a 5G guaranteed bit rate (GBR) QoS flow.

Based on the interworking architecture between the 5G system and the EPS, the embodiments of this application provide a communication method. A session of the EPS may be established when a session of the 5G system is established according to a network requirement, so that whether to establish an EPS session can be determined based on a current condition, thereby avoiding establishment of an unnecessary EPS session, and improving communication efficiency.

Figure 4:
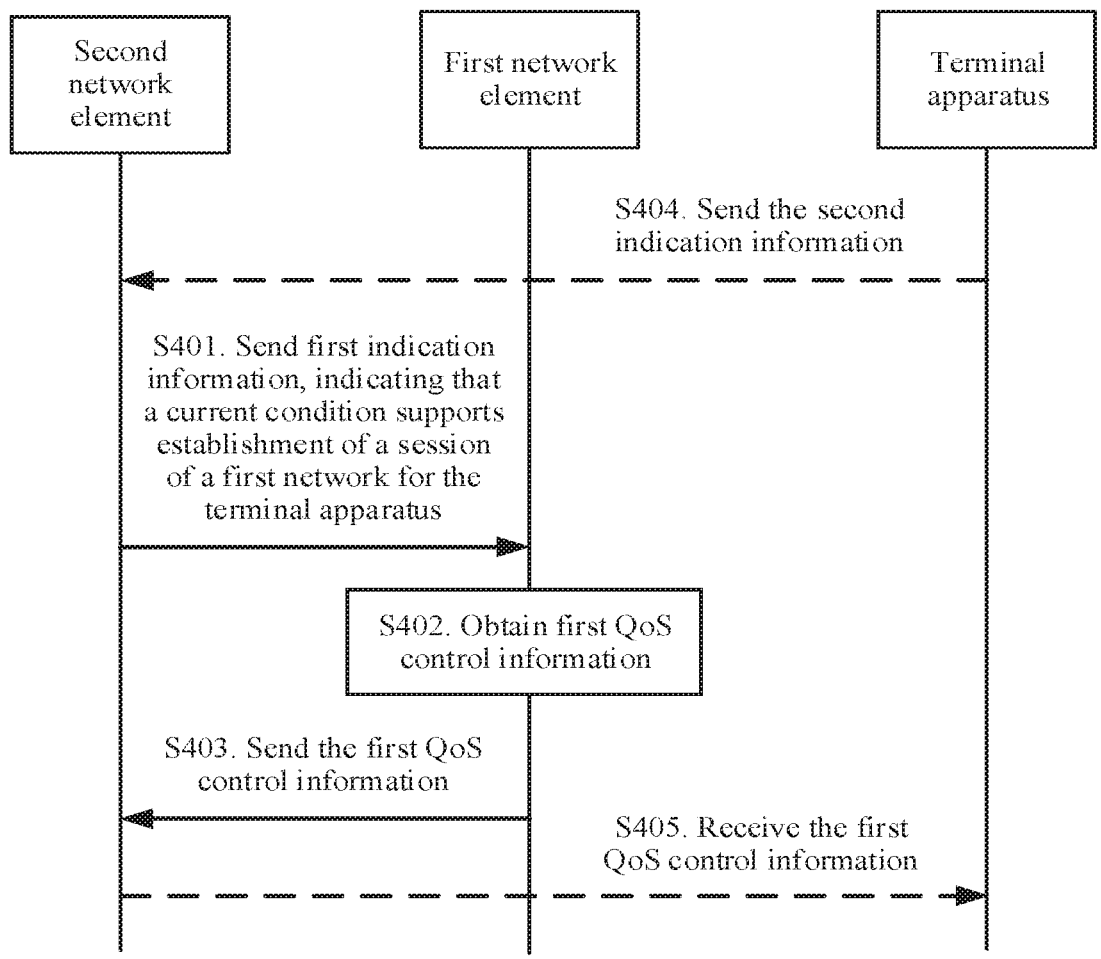
FIG. 4 is a schematic flowchart of a communication method according to an embodiment of this application.

The following describes a communication method according to an embodiment of this application with reference to FIG. 4. A method 400 in FIG. 4 may be applied to any architecture in FIG. 1 to FIG. 3. Alternatively, a method in FIG. 4 may be applied to another similar architecture. A first network may include an EPS network or a 4G system network, and a second network may include a 5G system network. A first network element may be an SMF or an entity having an SMF function. For example, the first network element may be an SMF+PGW-C module in the architectures 100 to 300. A second network element may be an AMF or an entity having an AMF function. A third network element may be a UDM or an entity having a UDM function, for example, may be an HSS+UDM module in the architectures 100 to 300. A policy control network element may be a PCF or an entity having a PCF function, for example, may be a PCF+PCRF module in the architectures 100 to 300. The method 400 includes the following steps.

Step 401. The second network element sends first indication information to the first network element; correspondingly, the first network element receives the first indication information from the second network element, where the first indication information is used to indicate that a current condition supports establishment of a session of the first network for a terminal apparatus.

In some examples, that the current condition supports establishment of the session of the first network for the terminal apparatus may include: An N26 interface exists between a 5G system and an EPS in a current network. In other words, a communications interface exists between an AMF in the 5G system and an MME in the EPS. In addition, that the current condition supports establishment of the session of the first network for the terminal apparatus may further include: The terminal apparatus is in a single registration state.

For example, the first indication information may include first information, and the first information may indicate, in an explicit or implicit manner, that the current condition supports establishment of the session of the first network for the terminal apparatus. In the explicit manner, the first information may directly indicate that a communications interface exists between a mobility management entity of the second network and a mobility management entity of the first network. For example, the first information is used to indicate that the current network supports an N26 interface between the AMF and the MME, or indicate that a 5G network supports interworking with a 4G network. In the implicit manner, the first information may be a default bearer identifier of the first network of the terminal apparatus, and the bearer identifier of the first network of the terminal apparatus may be used to implicitly indicate that the current condition supports establishment of the session of the first network for the terminal apparatus. The bearer identifier of the first network may be a dedicated bearer identifier of the first network, or may be a default bearer identifier of the first network. For example, the default bearer identifier of the first network may be a default EPS bearer identifier of the terminal apparatus, and the dedicated bearer identifier of the first network may be a dedicated EPS bearer identifier of the terminal apparatus.

In this embodiment of this application, the first network element determines, based on the first information included in the first indication information, that first quality of service QoS control information of a first session of the terminal apparatus in the first network needs to be obtained, to determine, based on the first indication information, to establish the session of the first network, thereby avoiding establishment of an unnecessary session of the first network and improving communication efficiency.

In this embodiment of this application, the default bearer identifier of the first network of the terminal apparatus is carried in the first information, to implicitly indicate content of the first information, thereby reducing overheads.

As mentioned above, that the current condition supports establishment of the session of the first network for the terminal apparatus may further include: The terminal apparatus is in the single registration state. If the terminal apparatus is in the single registration state, it indicates that the terminal apparatus cannot register with both the first network and the second network at the same time. For example, the terminal apparatus can register with only the 5G system or can register with only the EPS. If the terminal apparatus is in a dual registration state, it indicates that the terminal apparatus can register with the first network and the second network at the same time. For example, the terminal apparatus may register with the 5G network and the EPS network at the same time. If the current network supports the N26 interface, and the terminal apparatus is in the single registration state, the first network element determines that the session of the first network needs to be established for the terminal apparatus. If the terminal apparatus is in the dual registration state, that is, the terminal apparatus establishes contexts with the first network and the second network at the same time, the terminal apparatus may select any network at any moment to perform service transmission. For example, the terminal apparatus establishes contexts in the 5G system and the EPS at the same time.

In the foregoing case, the first indication information may further include second information, and the second information is used to indicate that the terminal apparatus is in the single registration state.

In this embodiment of this application, the first indication information includes the first information and the second information. When the condition indicated by the first indication information is met, the session of the first network of the first session may be established while the session of the second network of the first session is established, thereby avoiding establishment of an unnecessary session of the first network and improving communication efficiency.

In some examples, the receiving, by a first network element, first indication information from a second network element may include: receiving, by the first network element, a management request message of the first session from the second network element, where the management request message of the first session includes the first indication information.

The management request message of the first session may include a plurality of types. For example, the management request message of the first session may include any one of the following: a session establishment request (PDU session establishment request) message of the first session and a modification request (PDU session modification request) message of the first session. Further, the management request message of the first session may be a service request of a service-oriented interface, for example, Namf communication and an Nsmf_PDU session service. Namf refers to a service provided by the AMF, and includes communication or session management provided by the SMF, that is, a service.

Step 402. The first network element obtains the first QoS control information of the first session of the terminal apparatus after receiving the first indication information, where the first session is a session established by the terminal apparatus by using the second network.

The first QoS control information may be used to control quality of service of a service transmitted in the first network. In other words, the first QoS control information may be control information related to quality of service of a service transmitted in the first network. For example, the first QoS control information may include at least one of the following: a QoS parameter, an identifier of the QoS parameter, a packet filter, and priority information of the packet filter.

Optionally, after obtaining the first indication information, the first network element may determine, based on the first indication information, whether the session of the first network needs to be established for the terminal apparatus. For example, after receiving the first indication information, the first network element may directly determine that the session of the first network needs to be established for the terminal apparatus. Alternatively, after receiving the first indication information, the first network element may determine, based on the first indication information and other information, whether the session of the first network needs to be established for the terminal apparatus. For example, the other information may be the following third information.

Optionally, the method 400 further includes: obtaining, by the first network element, third information, where the third information is used to indicate that an attribute of the first session is to ensure continuity. The third information may be session continuity mode information of the first session or service and session continuity mode (SSC_mode) information of the first session.

Optionally, the third information may indicate that the attribute of the first session is to ensure continuity or indicate that the attribute of the first session is that continuity does not need to be ensured. In some examples, the first network element stores the third information, or the first network element may obtain subscription data from a UDM. The subscription data obtained from the UDM may include the third information. For example, the third information may be SSC_mode information. The first network element obtains the SSC_mode information of the first session from the UDM. If SSC_mode indicates that a session mode is a first mode, it may indicate that the first session is to ensure continuity. If SSC_mode indicates that the session mode is a second mode, it may indicate that the first session is that continuity does not need to be ensured.

In some examples, after obtaining the first indication information, the first network element may further determine whether the attribute of the first session is to ensure continuity. If the attribute of the first session is to ensure continuity, the first network element may determine that the session of the first network needs to be established for the terminal apparatus. If the attribute of the first session is that continuity does not need to be ensured, the first network element may determine that the session of the first network does not need to be established for the terminal apparatus.

In this embodiment of this application, when a network requirement indicated by the first indication information and a condition indicated by the third information are met, the session of the first network of the first session may be established while the session of the second network of the first session is established, thereby avoiding establishment of an unnecessary session of the first network and improving communication efficiency. When the third information indicates that the attribute of the first session is that continuity does not need to be ensured, the first network element does not need to establish the session of the first network for the terminal apparatus, thereby reducing communications resources.

After the first network element determines, based on the first indication information, that the session of the first network needs to be established for the terminal apparatus, the first network element may obtain the first QoS control information of the terminal apparatus. For example, the first QoS control information is QoS control information of a service transmitted in the EPS. The first QoS control information may include at least one of the following: the QoS parameter, the identifier of the QoS parameter, the packet filter, and the priority information of the packet filter. For example, the QoS parameter in the first QoS control information may be a QoS parameter of the default EPS bearer of the terminal apparatus, or may be a QoS parameter of the dedicated EPS bearer of the terminal apparatus. The packet filter and the priority information of the packet filter are a traffic flow template (TFT) corresponding to the EPS bearer, and the traffic flow template includes at least one packet filter.

The first network element may obtain the first QoS control information of the terminal apparatus in at least two manners.

In a first manner, the first network element may obtain second QoS control information from a third network element, and determine the first QoS control information based on the second QoS control information. The first network element may determine the first QoS control information in two ways. In a first way, the first network element may determine the second QoS control information as the first QoS control information without modifying the second QoS control information. In a second way, the first network element may send the second QoS control information to a policy control network element; after receiving the second QoS control information, the policy control network element may determine the first QoS control information based on the second QoS control information, where the first QoS control information is information authorized by a policy control network element. The policy control network element may modify the second QoS control information to obtain the authorized first QoS control information. Alternatively, the policy control network element may not modify the second QoS control information to obtain the authorized first QoS control information. The policy control network element may send the authorized first QoS control information to the first network element.

In a second manner, the first network element may receive the first QoS control information from a policy control network element, where the first QoS control information is information authorized by the policy control network element. The policy control network element may obtain the first QoS control information in two ways. In a first way, the policy control network element may generate the first QoS control information. In a second way, the policy control network element may obtain subscribed third QoS control information from a fourth network element, and the policy control network element may determine the first QoS control information based on the third QoS control information. Specifically, the policy control network element may select to modify or not to modify the third QoS control information, to obtain the first QoS control information.

In the first manner, in some examples, the first network element sends a subscription data obtaining request message of the first session to the third network element, where the subscription data obtaining request message includes fourth information, and the fourth information is used to request to provide subscription data of the first network: the first network element receives a subscription data response message of the first session from the third network element, where the subscription data response message includes the second QoS control information, and the second QoS control information is subscribed: the first network element obtains the first QoS control information based on the second QoS control information.

In some examples, the fourth information may include a data network name (DNN), and indicate that the subscription data of the first network needs to be obtained. In some other examples, the fourth information may further include an access point name (APN) of the first network, to indicate that subscription data of the first network needs to be obtained.

Further, the obtaining, by the first network element, the first QoS control information based on the second QoS control information may include: determining, by the first network element, the second QoS control information as the first QoS control information; or sending, by the first network element, the second QoS control information to the policy control network element; and receiving, by the first network element, the first QoS control information from the policy control network element, where the first QoS control information is based on the second QoS control information, and the first QoS control information is information authorized by the policy control network element.

In the second manner, in some examples, the method 400 further includes: sending, by the first network element, an establishment request message of the first session to the policy control network element, where the establishment request message of the first session includes fifth information, and the fifth information is used to instruct the policy control network element to establish the session of the first network; and the receiving, by the first network element, the first QoS control information from a policy control network element includes: receiving, by the first network element, an establishment response message of the first session from the policy control network element, where the establishment response message of the first session includes the first QoS control information.

Step 403. The first network element sends the first QoS control information to the second network element; correspondingly, the second network element receives the first QoS control information from the first network element.

In some examples, the first QoS control information may be carried in a first session management message, and the first session management message may be used to instruct to modify or establish QoS control information in the first network of the terminal apparatus.

For example, the first session management message may include a plurality of types. For example, the first session management message may include any one of the following: a session establishment message and a session modification message. Alternatively, the first session management message may be a message based on a service-oriented interface.

In this embodiment of this application, a communication method is provided based on an interworking architecture between the first network and the second network. When a condition indicated by the first indication information is supported, the session of the first network of the first session may be established while the session of the second network of the first session is established. Therefore, establishment of the session of the first network of the first session can be determined based on the current condition, thereby avoiding establishment of an unnecessary session of the first network, and improving communication efficiency.

Optionally, before step 401, the method 400 further includes step 404.

Step 404. The terminal apparatus sends second indication information to the second network element; correspondingly, the second network element receives the second indication information, where the second indication information is used to indicate that the current condition supports establishment of the session of the first network for a terminal apparatus.

Before step 401, the second network element may determine the first indication information in at least two ways. For example, in a first way, the second network element may receive the second indication information from the terminal apparatus, and may determine the first indication information based on the second indication information. For example, if the second network element determines, based on the second indication information, that a current network condition indicates that the session of the first network is established for the terminal apparatus, the second network element may send the first indication information to the first network element, to indicate that the current condition supports establishment of the session of the first network for the terminal apparatus.

The second indication information may include the first information. Further, the second indication information may further include the second information. For example, the terminal apparatus may obtain the fifth information from the second network element in a process in which the terminal apparatus registers with a network, where the fifth information is used to indicate that the communications interface exists between the mobility management entity of the second network and the mobility management entity of the first network. In addition, the first information is determined based on the fifth information. In the first way, the first information may be explicit or implicit.

In a second way, the second network element may generate the first indication information. For example, the second network element may obtain the fifth information, determine the first information based on the fifth information, and generate the first indication information. Further, the terminal apparatus may send the second information to the second network element, so that the second network element adds the second information to the first indication information. In the second way, the first information is usually explicit.

For example, the second network element may be an AMF. Therefore, the second network element is the mobility management entity of the second network, and the second network element may determine that the communications interface exists between the mobility management entity of the second network and the mobility management entity of the first network. Therefore, when there is a communications interface, the second network element may generate the first indication information.

Optionally, after step 403, after obtaining the first QoS control information, the second network element may send the first QoS control information to a base station; after receiving the first QoS control information, the base station may send the first QoS control information to the terminal apparatus. In this case, the method 400 further includes step 405.

Step 405. The second network element sends the first QoS control information to the terminal apparatus by using the base station; correspondingly, the terminal apparatus receives the first QoS control information of the first session of the terminal apparatus. The first session is a session established by the terminal apparatus by using the second network.

The first QoS control information may be used to control quality of service of a service transmitted in the first network. In other words, the first QoS control information may be control information related to quality of service of a service transmitted in the first network. For example, the first QoS control information may include at least one of the following: a QoS parameter, an identifier of the QoS parameter, a packet filter, and priority information of the packet filter.

Optionally, in step 405, the first QoS control information may be carried in a second session management message, and the second session management message is used to instruct to modify or establish QoS control information in the first network of the terminal apparatus.

The second session management message may include a plurality of types. For example, the second session management message may include at least one of the following: a session establishment accept (PDU session establishment accept) message, an access point-specific resource setup (AN-specific resource setup) message, and a session modification message. Further, the foregoing message may be service obtaining interaction of a service-oriented interface.

Figure 5A:
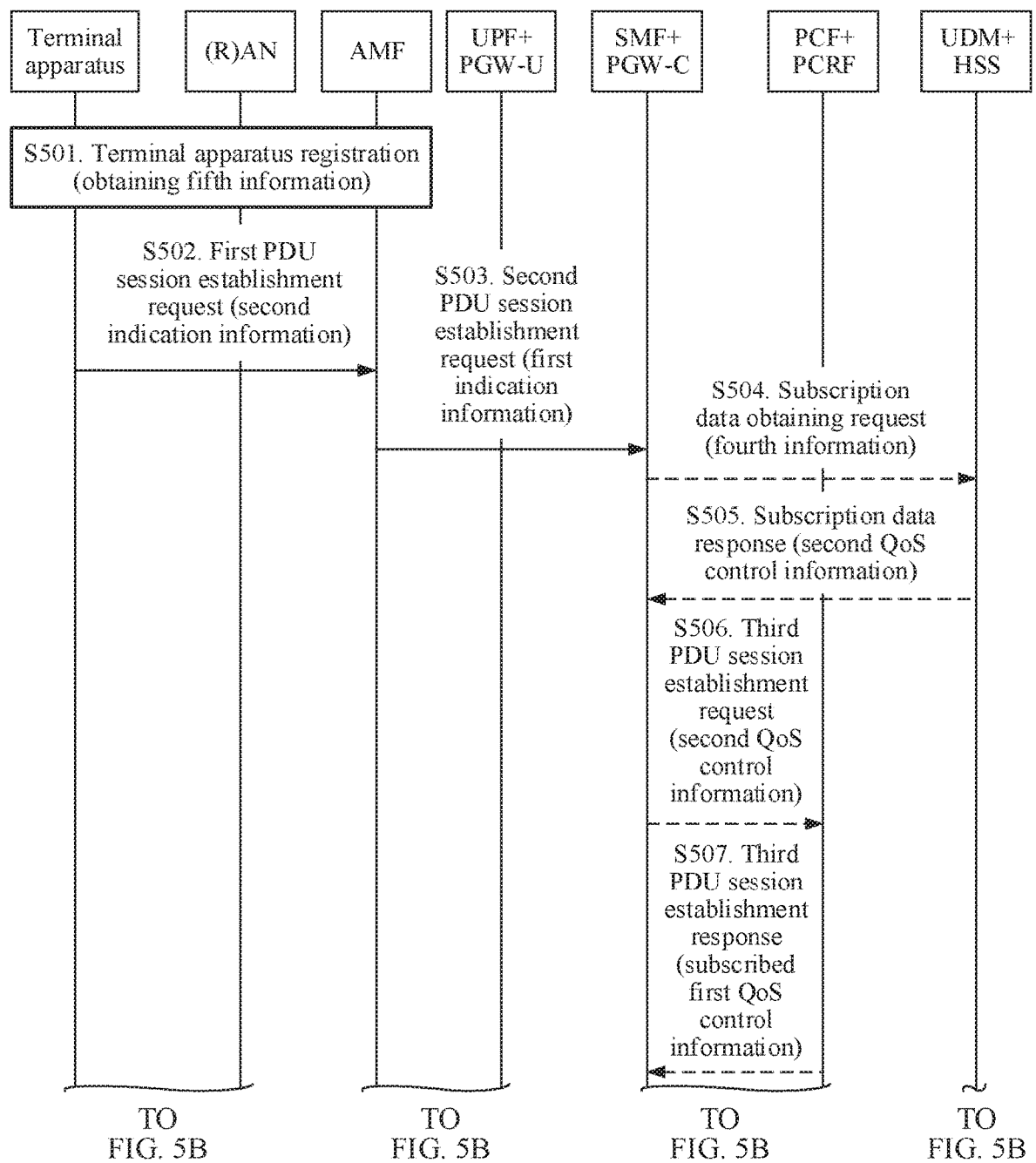
FIG. 5A and FIG. 5B are a schematic interaction diagram of a communication method according to another embodiment of this application.
Figure 5B:
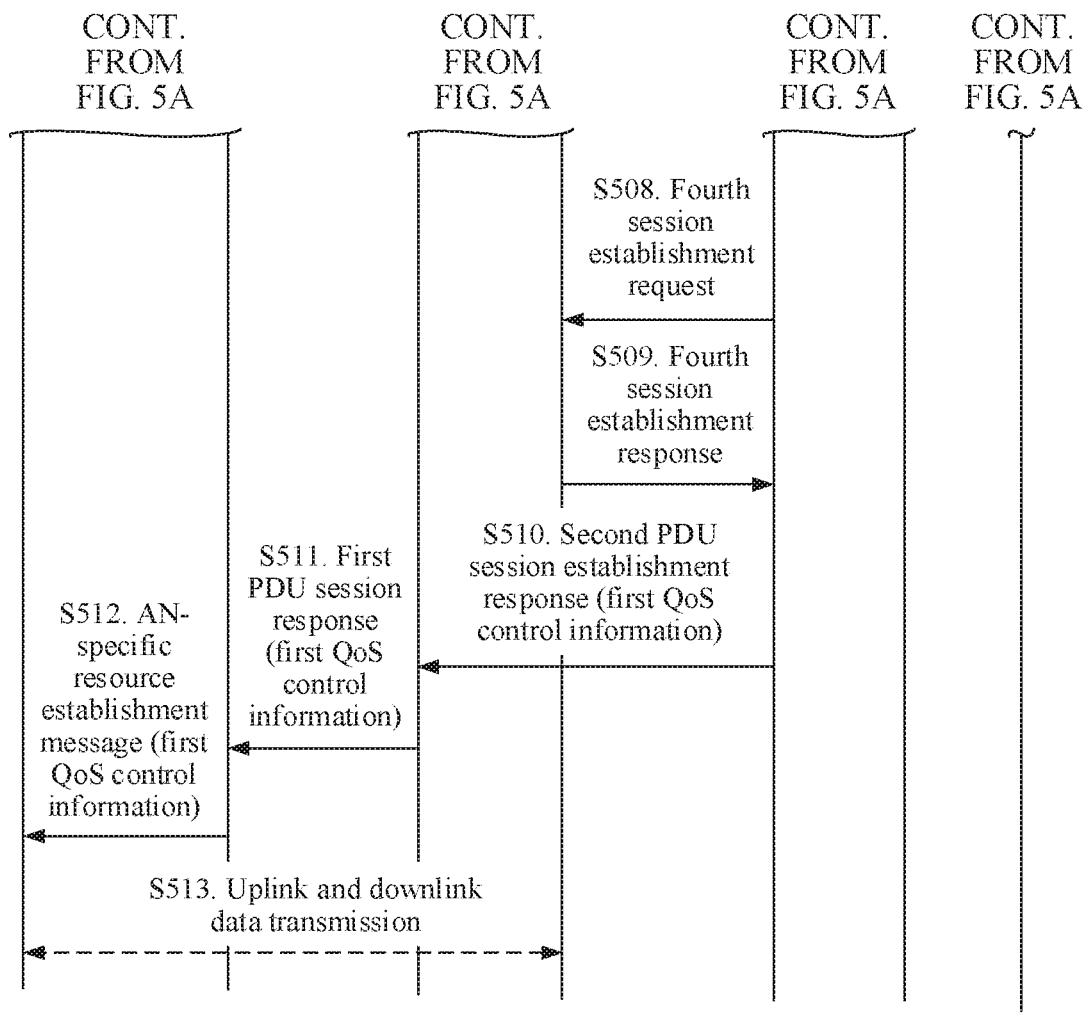
Figure 6A:
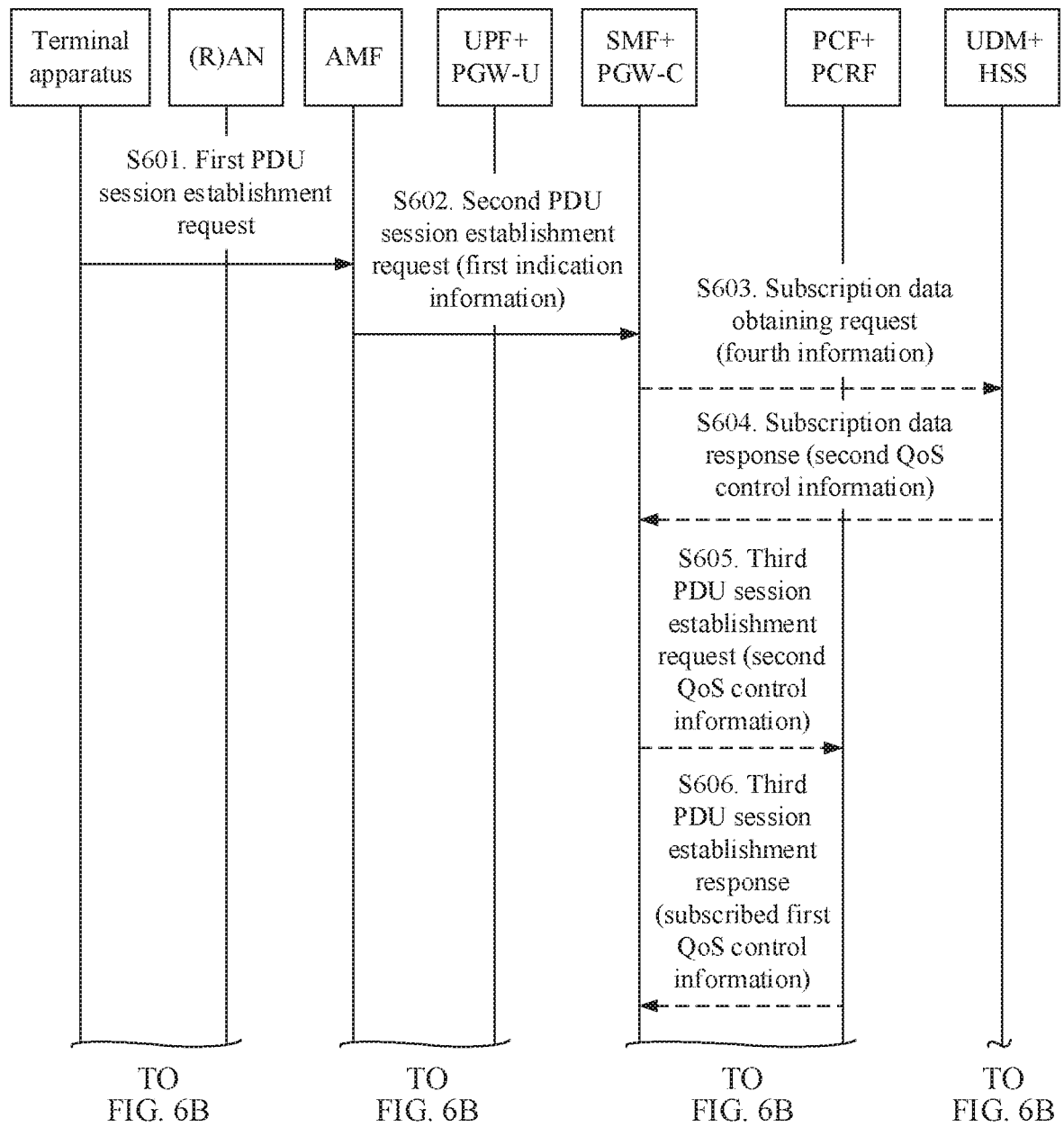
FIG. 6A and FIG. 6B are a schematic interaction diagram of a communication method according to another embodiment of this application.
Figure 6B:
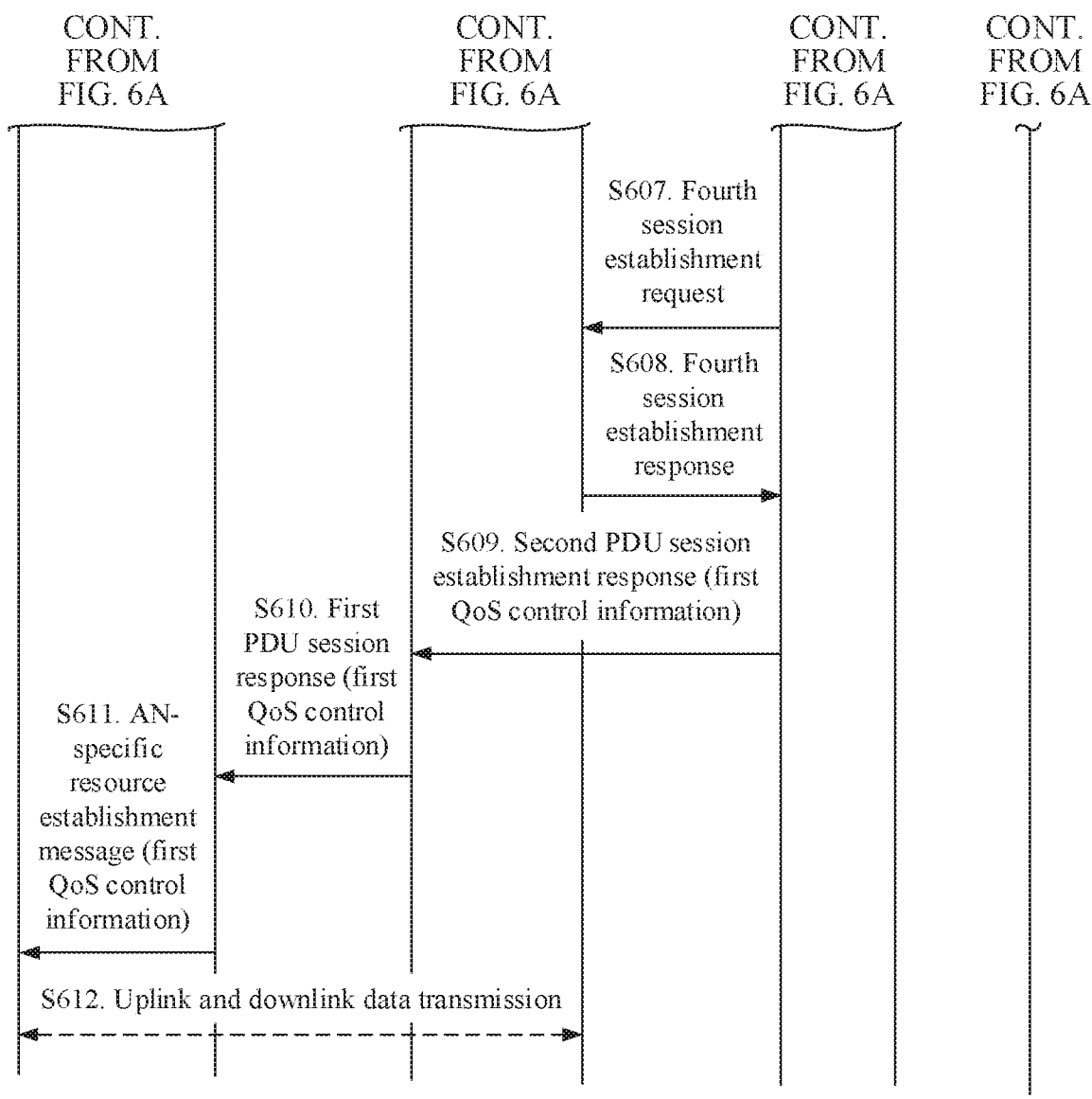
Figure 7:
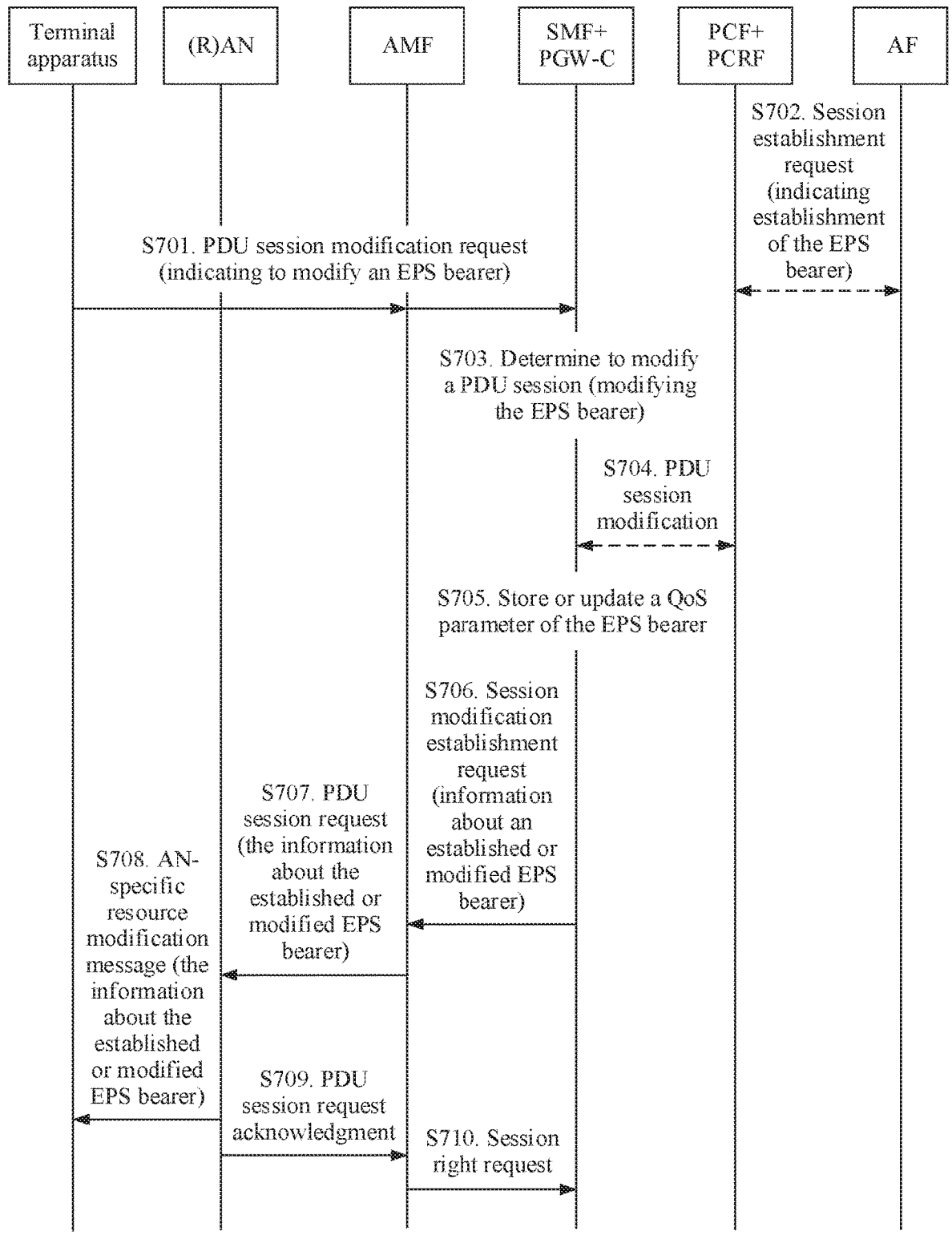
FIG. 7 is a schematic interaction diagram of a communication method according to another embodiment of this application.
Figure 8:
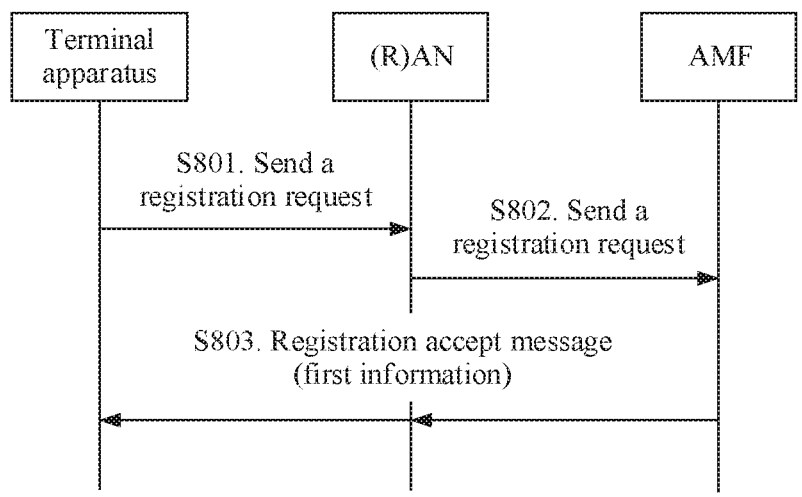
FIG. 8 is a schematic interaction diagram of a communication method according to another embodiment of this application.

The following describes specific examples of the communication method in this embodiment of this application with reference to FIG. 5A to FIG. 8. FIG. 5A to FIG. 6B show a communication procedure in a session establishment process. FIG. 7 shows a communication procedure in a session modification process. FIG. 8 shows a communication procedure in which a terminal apparatus registers with a network. First indication information in FIG. 5A and FIG. 5B is determined based on second indication information sent by a terminal apparatus. First indication information in FIG. 6A and FIG. 6B is generated by an AMF. In addition, a (R)AN in FIG. 5A to FIG. 8 represents an access network (AN) entity or a radio access network (RAN) entity. For example, the (R)AN may include a base station.

Referring to FIG. 5A and FIG. 5B in the following, the method in FIG. 5A and FIG. 5B may be applied to the architectures 100 to 300. FIG. 5A and FIG. 5B show a process in which the first indication information is determined based on the second indication information. The method in FIG. 5A and FIG. 5B includes the following steps.

S501. The terminal apparatus obtains fifth information in a process in which the terminal apparatus registers with a network, where the fifth information is used to indicate that a communications interface exists between a mobility management entity of a second network and a mobility management entity of a first network.

For example, the fifth information may indicate that an AMF supports an N26 interface (that is, message exchange can be performed between the AMF and an MME) or that the AMF supports interworking with 4G.

S502. The terminal apparatus sends a first PDU session establishment request to the AMF, where the first PDU session establishment request is used to request to establish a first session of the terminal apparatus in a 5G system. The first PDU session establishment request includes the second indication information.

For specific descriptions of the second indication information, refer to related content in FIG. 4. For example, the second indication information may include first information, and the first information is used to indicate that the AMF supports an N26 interface or that the AMF supports interworking with 4G.

For example, in an implicit indication manner, the first information may be a default EPS bearer identifier of the terminal apparatus. For example, when the terminal apparatus determines to initiate a session request to a network, if the AMF supports an N26 interface, the terminal apparatus may determine to allocate the default EPS bearer identifier.

In an explicit indication manner, the first information may be used to directly indicate that an N26 interface exists between the AMF and an MME in an EPS.

The first information may be determined based on the fifth information in S501.

Further, the second indication information may further include second information, and the second information is used to indicate that the current condition is that the terminal apparatus is in a single registration state.

Further, a condition for determining that an EPS session needs to be established may further include: A mode of a first session of the terminal apparatus is to keep continuity, or a DNN indicates a voice network or another network that needs to ensure session continuity.

Further, a PDU session establishment request message includes a DNN. If the terminal apparatus stores an EPS APN corresponding to the DNN, optionally, the first indication information may further include the EPS APN.

Optionally, the AMF may obtain a subscribed UE-AMBR of a user EPS network.

Optionally, the AMF may perform SMF selection based on the PDU session establishment request received from the terminal apparatus.

S503. The AMF sends a second PDU session establishment request to an SMF+PGW-C based on the first PDU session establishment request, where the second PDU session establishment request message includes first indication information.

Optionally, the AMF may determine the second indication information as the first indication information. For specific descriptions of the first indication information, refer to related content in FIG. 4.

Optionally, the second PDU session establishment request is generated based on the first PDU session establishment request.

The first PDU session establishment request may be carried in a second session establishment request message.

Optionally, the first indication information may further include the EPS APN.

S504. The SMF+PGW-C sends a subscription data obtaining request to a UDM+HSS, where the subscription data obtaining request includes fourth information, and the fourth information is used to request to provide subscription data of the first network.

For specific descriptions of the fourth information, refer to related content in examples of FIG. 4.

For example, after the SMF+PGW-C receives the PDU session establishment request message, if it is detected that the PDU session establishment request message includes the first indication information, the SMF+PGW-C may add the fourth information to the subscription data obtaining request sent to a UDM+HSS.

The fourth information may include DNN/APN information, to indicate that the UDM+HSS provides both 5G subscription data and EPS subscription data. The DNN/APN is used to indicate that subscription data of a corresponding DNN/APN is obtained.

S505. The UDM+HSS sends a subscription data response message to the SMF+PGW-C. The subscription data response message includes second QoS control information.

For specific descriptions of the subscription data response message and the second QoS control information, refer to related content in FIG. 4.

For example, the second QoS control information may include EPS subscription data of the terminal apparatus. The EPS subscription data is subscription data of a particular APN corresponding to a DNN, including an EPS subscribed QoS text and a subscribed APN-AMBR. For example, the EPS subscribed QoS text may include: a QoS class identifier (QCI), and an allocation and retention priority (ARP).

S506. The SMF+PGW-C sends a third PDU session establishment request to a PCF+PCRF. The third PDU session establishment request includes the second QoS control information.

Optionally, the SMF+PGW-C may perform PCF selection. After selecting the PCF, the SMF+PGW-C sends a PDU session establishment request to the PCF+PCRF.

S507. The PCF+PCRF sends a third PDU session establishment response to the SMF+PGW-C, where the third PDU session establishment response corresponds to the third PDU session establishment request, and the third PDU session establishment response includes subscribed first QoS control information.

The first QoS control information is determined based on the second QoS control information. For specific content of the first QoS control information, refer to related content in FIG. 4. Details are not described herein again.

For example, if a dynamic PCC architecture is deployed in a network, the PDU session establishment response may include an authorized default PCC rule. The authorized default PCC rule includes an authorized default 5G QoS rule and default EPS bearer information. The subscribed first QoS control information may include the default EPS bearer information.

Further, in step S507, the PCF+PCRF determines that a session of the EPS needs to be established for the terminal apparatus. The determining may be based on received indication information sent by the SMF+PGW-C.

Optionally, a second QoS control parameter may include a default EPS bearer QoS parameter. The SMF+PGW-C may allocate a 5G QoS flow ID, and correspondingly store the 5G QoS flow ID and a corresponding QoS flow parameter. Further, the SMF+PGW-C may store corresponding default EPS bearer information. The default EPS bearer information may include a default EPS bearer ID and a default EPS QoS text (profile). For example, the default EPS QoS text includes a QCI or an ARP. The default EPS bearer information and information related to a 5G default QoS flow may be correspondingly stored. The default EPS bearer information includes a default EPS bearer QoS parameter that is obtained by the SMF+PGW-C from the UDM+HSS based on a local policy or is a default EPS bearer QoS parameter that is obtained by the SMF+PGW-C from the PCF+PCRF.

S508. The SMF+PGW-C sends a fourth session establishment request message to a UPF+PGW-U.

The fourth session establishment request message is a session establishment request of an N4 interface. The N4 interface is a communications interface between the UPF+PGW-U and the SMF+PGW-C.

S509. The UPF+PGW sends a fourth session establishment response message to the SMF+PGW-C.

The fourth session establishment response is a session establishment response message of the N4 interface.

S510. The SMF+PGW-C sends a session management request determining message to the AMF, where the session management request determining message includes a second PDU session establishment response message, and the second PDU session establishment response message includes the first QoS control information.

The first QoS control information may include, for example, the default EPS bearer QoS parameter. Further, the first QoS control information includes a corresponding EPS bearer ID.

S511. The AMF sends a first PDU session request response message to a 5G AN. The first PDU session request response message includes the first QoS control information.

For example, the first QoS control information may include the default EPS bearer QoS parameter. Further, the first QoS control information may further a corresponding EPS bearer ID.

The first PDU session request message is a PDU session request message of an N2 interface. The N2 interface is a communications interface between the AMF and the 5G RAN.

S512. Optionally, the AN sends an AN-specific resource establishment message to the terminal apparatus, where the AN-specific resource establishment message includes the first QoS control information.

For example, an air interface resource establishment procedure may be performed between the AN and the terminal apparatus, and the first QoS control information is carried in the procedure.

S513. The terminal apparatus performs uplink and downlink data transmission with a network device.

In the example in FIG. 5A and FIG. 5B, the AMF determines and sends the first indication information based on the second indication information sent by the terminal apparatus, so that a network side determines, based on the first indication information, to generate the session of the EPS. The session of the EPS does not need to be established at any moment, and a pre-establishment procedure is sent only in a specific condition. In this way, system overheads are reduced as much as possible. This reduces unnecessary overheads caused when establishment of the session of the EPS is initiated at any time.

Referring to FIG. 6A and FIG. 6B in the following, the method in FIG. 6A and FIG. 6B may be applied to the architectures 100 to 300. FIG. 6A and FIG. 6B show a process in which the first indication information is generated by an AMF. The method in FIG. 6A and FIG. 6B includes the following steps.

S601. The terminal apparatus sends a first PDU session establishment request to the AMF, where the first PDU session establishment request is used to request to establish a first session of the terminal apparatus in a 5G system.

For example, the terminal apparatus determines that a session needs to be established, and the terminal apparatus sends the first PDU session establishment request to the AMF.

S602. The AMF sends a second PDU session establishment request to a selected SMF+PGW—C based on the first PDU session establishment request, where the second PDU session establishment request message includes first indication information.

Optionally, the second PDU session establishment request is generated based on the first PDU session establishment request.

Optionally, the AMF generates the first indication information, and adds the first indication information to the second PDU session establishment request.

For example, the first indication information may include first information, and the first information is used to indicate that the AMF supports N26 interface information or that the AMF supports interworking with 4G.

For example, in an implicit indication manner, the first information may be a default EPS bearer identifier of the terminal apparatus. For example, when the terminal apparatus determines to initiate a session request to a network, if the AMF supports an N26 interface, the terminal apparatus may determine to allocate the default EPS bearer identifier.

In an explicit indication manner, the first information may be used to directly indicate that an N26 interface exists between the AMF and an MME in an EPS.

For example, the AMF may determine the first information, that is, capability information of the N26 interface. Therefore, the AMF may generate the first indication information based on the first information, and the first indication information includes the first information. Further, the AMF may receive second information from the terminal apparatus, that is, information indicating that the terminal apparatus is in a single registration state. Therefore, the AMF may add the second information to the first indication information. Alternatively, optionally, the AMF determines, based on a capability of the AMF in supporting the N26 interface and depending on that the terminal apparatus is in the single registration state, that indication information is included. The indication information is used to indicate that a session management function establishes a session of the EPS network, for example, EPS bearer information, and includes information such as a QoS parameter.

S603. The SMF+PGW-C sends a subscription data obtaining request to a UDM+HSS, where the subscription data obtaining request includes fourth information, and the fourth information is used to request to provide subscription data of the first network.

For specific descriptions of the fourth information, refer to related content in examples of FIG. 4.

For example, after the SMF+PGW-C receives the PDU session establishment request message, if it is detected that the PDU session establishment request message includes the first indication information, the SMF+PGW-C may add the fourth information to the subscription data obtaining request sent to a UDM+HSS.

The fourth information may include DNN/APN information, to indicate that the UDM+HSS provides both 5G subscription data and EPS subscription data. The DNN/APN is used to indicate that subscription data of a corresponding DNN/APN is obtained.

S604. The UDM+HSS sends a subscription data response message to the SMF+PGW-C. The subscription data response message includes second QoS control information.

For specific descriptions of the subscription data response message and the second QoS control information, refer to related content in FIG. 4.

For example, the second QoS control information may include EPS subscription data of the terminal apparatus. The EPS subscription data is subscription data of a particular APN corresponding to a DNN, including an EPS subscribed QoS text and a subscribed APN-AMBR. For example, the EPS subscribed QoS text may include: a QoS class identifier (QCI), and an allocation and retention priority (ARP).

S605. The SMF+PGW-C sends a third PDU session establishment request to a PCF+PCRF. The third PDU session establishment request includes the second QoS control information.

Optionally, the SMF+PGW-C may perform PCF selection. After selecting the PCF, the SMF+PGW-C sends a PDU session establishment request to the PCF+PCRF.

S606. The PCF+PCRF sends a third PDU session establishment response to the SMF+PGW-C, where the third PDU session establishment response corresponds to the third PDU session establishment request, and the third PDU session establishment response includes subscribed first QoS control information.

The first QoS control information is determined based on the second QoS control information. For specific content of the first QoS control information, refer to related content in FIG. 4. Details are not described herein again.

For example, if a dynamic PCC architecture is deployed in a network, the PDU session establishment response may include an authorized default PCC rule. The authorized default PCC rule includes an authorized default 5G QoS rule and default EPS bearer information. The subscribed first QoS control information may include the default EPS bearer information.

Further, in step S507, the PCF+PCRF determines that a session of the EPS needs to be established for the terminal apparatus. The determining may be based on received indication information sent by the SMF+PGW-C.

Optionally, a second QoS control parameter may include a default EPS bearer QoS parameter. The SMF+PGW-C may allocate a 5G QoS flow ID, and correspondingly store the 5G QoS flow ID and a corresponding QoS flow parameter. Further, the SMF+PGW-C may store corresponding default EPS bearer information. The default EPS bearer information may include a default EPS bearer ID and a default EPS QoS rule. The default EPS bearer information and a 5G default QoS flow may be correspondingly stored. The default EPS bearer information includes a default EPS bearer QoS parameter that is obtained by the SMF+PGW-C from the UDM+HSS based on a local policy or is a default EPS bearer QoS parameter that is obtained by the SMF+PGW-C from the PCF+PCRF.

S607. The SMF+PGW-C sends a fourth session establishment request message to a UPF+PGW-U.

The fourth session establishment request message is a session establishment request of an N4 interface. The N4 interface is a communications interface between the UPF+PGW-U and the SMF+PGW-C.

S608. The UPF+PGW sends a fourth session establishment response message to the SMF+PGW-C.

The fourth session establishment response is a session establishment response message of an N4 interface.

S609. The SMF+PGW-C sends a session management request determining message to the AMF, where the session management request determining message includes a second PDU session establishment response message, and the second PDU session establishment response message includes the first QoS control information.

The first QoS control information may include, for example, the default EPS bearer QoS parameter. Further, the first QoS control information includes a corresponding EPS bearer ID. Optionally, the QoS control information may further include TFT information.

S610. The AMF sends a first PDU session request response message to a 5G AN. The first PDU session request response message includes the first QoS control information.

For example, the first QoS control information may include the default EPS bearer QoS parameter. Further, the first QoS control information may further a corresponding EPS bearer ID.

The first PDU session request message is a PDU session request message of an N2 interface. The N2 interface is a communications interface between the AMF and the 5G RAN.

Optionally, S610 further includes: allocating, by the terminal apparatus, a default EPS bearer identifier.

S611. Optionally, the AN sends an AN-specific resource establishment message to the terminal apparatus, where the AN-specific resource establishment message includes the first QoS control information.

For example, an air interface resource establishment procedure may be performed between the AN and the terminal apparatus, and the first QoS control information is carried in the procedure.

S612. The terminal apparatus performs uplink and downlink transmission with a network device.

In this embodiment of this application, the AMF automatically generates the first indication information, so that a network side determines, based on the first indication information, to generate the session of the EPS. The session of the EPS does not need to be established at any moment, and a pre-establishment procedure is sent only in a specific condition. In this way, system overheads are reduced as much as possible. This reduces unnecessary overheads caused when establishment is initiated at any time.

Referring to FIG. 7 in the following, the method in FIG. 7 may be applied to the architectures 100 to 300. FIG. 7 shows a communication procedure of session modification. S701, S702, and S703 are three parallel steps. During execution, any one of S701, S702, and S703 may be performed. In FIG. 7, first QoS control information may include information about an established or modified EPS bearer. The method in FIG. 7 includes the following steps.

S701. A terminal apparatus sends a PDU session modification request to an AMF. Further, after receiving the PDU modification request, the AMF sends the PDU session modification request to an SMF+PGW-C. The PDU session modification request is used to instruct to modify a 5G QoS parameter and instruct to modify an EPS session bearer parameter.

For example, when the terminal apparatus determines that an existing PDU session needs to be modified, the terminal apparatus sends a PDU session modification request to the AMF, and the AMF sends the PDU session modification request to the SMF+PGW-C. The terminal apparatus may modify an existing QoS resource, or delete an established QoS resource, or delete a service on a QoS resource by following the procedure.

S702. An AF sends a session establishment request to a PCF+PCRF, and establishes an EPS session bearer.

The session establishment request is a session establishment request of an N5 interface. The N5 interface is a communications interface between the AF and the PCF+PCRF.

For example, the AF may actively request a network to establish a resource for a service. When necessary, the AF initiates an N5 session establishment procedure to the PCF+PCRF to provide service information and a QoS requirement of the service. When receiving an N5 session request, the PCF+PCRF determines, based on an indication sent by a previous SMF request service, that an EPS QoS rule is established when a 5G QoS rule is determined, and sends the SMF+PGW-C a PDU-CAN modification request including the determined 5G QoS rule and the EPS QoS rule.

S703. The SMF+PGW-C determines that a QoS parameter of a 5G QoS flow needs to be modified, and determines that a QoS parameter of an EPS bearer needs to be modified.

For example, the SMF+PGW-C determines, based on a local policy, to modify the QoS parameter of the 5G QoS flow, and determines, based on first indication information received in a session establishment process, to modify the QoS parameter of the EPS bearer.

S704. A PDU session modification procedure is performed between the SMF+PGW-C and the PCF+PCRF.

The PDU session modification procedure is similar to a PDU session establishment procedure. For the PDU session modification procedure, refer to related content of S506 to S507 in FIG. 5A and FIG. 5B and S605 to S606 in FIG. 6A and FIG. 6B.

S705. The SMF+PGW-C stores or updates the QoS parameter of the EPS bearer.

For example, if the session modification procedure initiated by the terminal apparatus and a network side is used to modify a parameter of an existing 5G QoS flow, the SMF+PGW-C stores an updated new 5G QoS flow parameter, and stores a QoS parameter of a corresponding EPS bearer. If the terminal apparatus and a network create a new 5G QoS flow when initiating session modification, the network determines to establish a dedicated EPS bearer, and the SMF+PGW-C correspondingly stores the established dedicated EPS bearer when storing the new 5G QoS flow information.

S706. The SMF+PGW-C sends a PDU session modification request to the AMF, where the PDU session modification request includes information about an established or modified EPS bearer.

For example, the SMF+PGW-C sends a session management request to the AMF, where the session management request includes a PDU session modification request, and the PDU session modification request includes the information about the established or modified EPS bearer.

S707. The AMF sends a PDU session request to a (R)AN, where the PDU session request includes the information about the established or modified EPS bearer.

The PDU session request in S707 is a PDU session request of an N2 interface. The N2 interface is a communications interface between the AMF and an AN.

S708. The AN sends an AN-specific resource modification message to the terminal apparatus, where the AN-specific resource modification message includes the information about the established or modified EPS bearer.

For example, an AN-specific resource modification procedure is established between the terminal apparatus and the AN: in the procedure, the AN sends the information about the established or modified EPS bearer to the terminal apparatus. If the terminal apparatus determines that the information about the established or modified EPS bearer is information about a newly established EPS bearer, the terminal apparatus allocates an EPS bearer identifier to the bearer information.

S709. The AN sends a PDU session request acknowledgment message to the AMF.

The PDU session request acknowledgement message in S709 is a PDU session request acknowledgement message of the N2 interface.

For example, the AN sends an N2 PDU session request acknowledgment to the AMF. If the terminal apparatus allocates the EPS bearer identifier, the PDU session request acknowledgment message may include the EPS bearer identifier.

S710. The AMF sends a session right request to the SMF+PGW-C.

Optionally, if the terminal apparatus allocates the EPS bearer identifier, the session right request includes the EPS bearer identifier.

In this embodiment of this application, in an existing 5G session modification process, a bearer parameter of an EPS can be modified according to a network requirement. In other words, only when a particular condition is met, a system modifies and establishes a bearer parameter of the EPS in a process of modifying a 5G session, thereby avoiding unnecessary overheads and improving communication efficiency.

In the examples in FIG. 5A to FIG. 7, when the terminal apparatus accesses a 5G network and establishes a session or establishes a dedicated QoS flow with the 5G network, the network side may determine, depending on whether the network supports the N26 interface, a registration mode of the terminal apparatus, and a mode of a session, whether to establish a session of the EPS. For example, in a session establishment process, when determining, based on received fourth information, to obtain a subscribed context of the 5G session from a UDM+HSS, the SMF obtains a subscribed PDN context of the EPS. The PDN context includes first QoS control information, such as an EPS subscribed QoS rule (EPS subscribed QoS profile), and a subscribed access point name aggregate maximum bit rate (subscribed access point name aggregate maximum bit rate, subscribed APN-AMBR). The SMF+PGW-C provides an authorized default 5G QoS rule and authorized default EPS bearer information for the terminal apparatus. When deploying policy and charging control (PCC), the SMF+PGW-C interacts with the PCF to obtain the authorized default 5G QoS rule and the authorized default EPS bearer information. Otherwise, the SMF may perform authorization based on a local policy.

Optionally, in a network-initiated dedicated bearer establishment process or a terminal apparatus-initiated dedicated bearer establishment process, the PCF/SMF+PGW-C determines the QoS rule of the EPS while determining the 5G QoS rule based on the indication information. The SMF+PGW-C determines whether to establish a new EPS bearer context. When a new EPS bearer needs to be established, EPS bearer information is sent to the terminal apparatus, and an EPS bearer ID allocated by the terminal apparatus is received.

Optionally, when a QoS flow is deleted or modified, the network side may synchronously modify or delete corresponding EPS bearer information.

Referring to FIG. 8 in the following, the method in FIG. 8 may be applied to the architectures 100 to 300. FIG. 8 shows a communication procedure in which a terminal apparatus registers with a network, and shows a process in which the terminal apparatus obtains fifth information when registering with the network. The method in FIG. 8 includes the following steps.

S801. The terminal apparatus sends a registration request to a (R)AN; correspondingly, the (R)AN receives the registration request.

S802. The (R)AN sends the registration request to an AMF

For example, the (R)AN may select an AMF, and send the registration request to the selected AMF.

S803. The AMF sends a registration accept message to the terminal apparatus through the (R)AN, where the registration accept message includes the fifth information.

For specific content of the fifth information, refer to related descriptions in FIG. 4. For example, the fifth information may be directly used to indicate that a communications interface exists between a mobility management entity of a second network and a mobility management entity of a first network. For example, the fifth information is used to indicate that a current network supports an N26 interface between the AMF and an MME.

In this embodiment of this application, the registration accept message sent by the AMF to the terminal apparatus carries the fifth information, and the fifth information is used to indicate that the communications interface exists between the mobility management entity of the second network and the mobility management entity of the first network. Therefore, communication is performed based on the fifth information, thereby improving communication efficiency.

With reference to FIG. 1 to FIG. 8, the foregoing describes in detail the communication method according to the embodiments of this application. With reference to FIG. 9 to FIG. 14, the following describes in detail a network element and a terminal apparatus according to the embodiments of this application.

Figure 9:
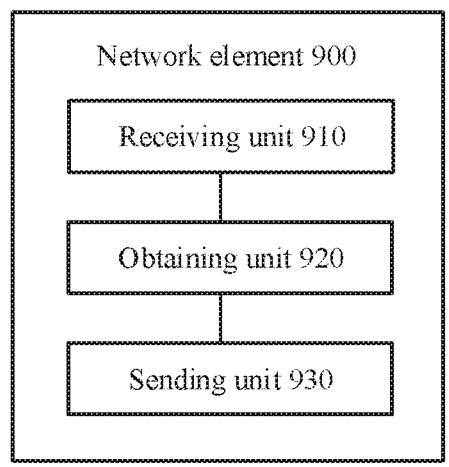
FIG. 9 is a schematic structural diagram of a network element according to an embodiment of this application.

FIG. 9 is a schematic block diagram of a network element 900 according to an embodiment of this application. It should be understood that the network element 900 can perform all the steps performed by the first network element in the methods shown in FIG. 1 to FIG. 8. To avoid repetition, details are not described herein again. The network element 900 includes a receiving unit 910, an obtaining unit 920, and a sending unit 930.

The receiving unit 910 is configured to receive first indication information from a second network element, where the first indication information is used to indicate that a current condition supports establishment of a session of a first network for a terminal apparatus.

The obtaining unit 920 is configured to obtain first quality of service QoS control information of a first session of the terminal apparatus after receiving the first indication information, where the first session is a session established by the terminal apparatus by using a second network.

The sending unit 930 is configured to send the first QoS control information to the second network element.

Figure 10:
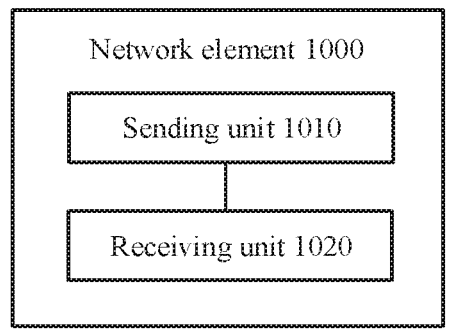
FIG. 10 is a schematic structural diagram of a network element according to another embodiment of this application.

FIG. 10 is a schematic block diagram of a network element 1000 according to an embodiment of this application. It should be understood that the network element 1000 can perform all the steps performed by the second network element in the methods shown in FIG. 1 to FIG. 8. To avoid repetition, details are not described herein again. The network element 1000 includes a sending unit 1010 and a receiving unit 1020.

The sending unit 1010 is configured to send first indication information to a first network element, where the first indication information is used to indicate that a current condition supports establishment of a session of a first network for a terminal apparatus.

The receiving unit 1020 is configured to receive first quality of service QoS control information of a first session of the terminal apparatus from the first network element, where the first session is a session established by the terminal apparatus by using a second network.

Figure 11:
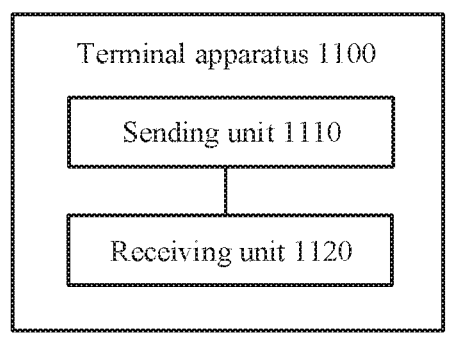
FIG. 11 is a schematic structural diagram of a terminal apparatus according to an embodiment of this application.

FIG. 11 is a schematic block diagram of a terminal apparatus 1100 according to an embodiment of this application. It should be understood that the terminal apparatus 1100 can perform all the steps performed by the terminal apparatus in the methods shown in FIG. 1 to FIG. 8. To avoid repetition, details are not described herein again. The terminal apparatus 1100 includes a sending unit 1110 and a receiving unit 1120.

The sending unit 1110 is configured to send second indication information to a second network element, where the second indication information is used to indicate that a current condition supports establishment of a session of a first network for the terminal apparatus.

The receiving unit 1120 is configured to receive first quality of service QoS control information of a first session of the terminal apparatus, where the first session is a session established by the terminal apparatus by using a second network.

Figure 12:
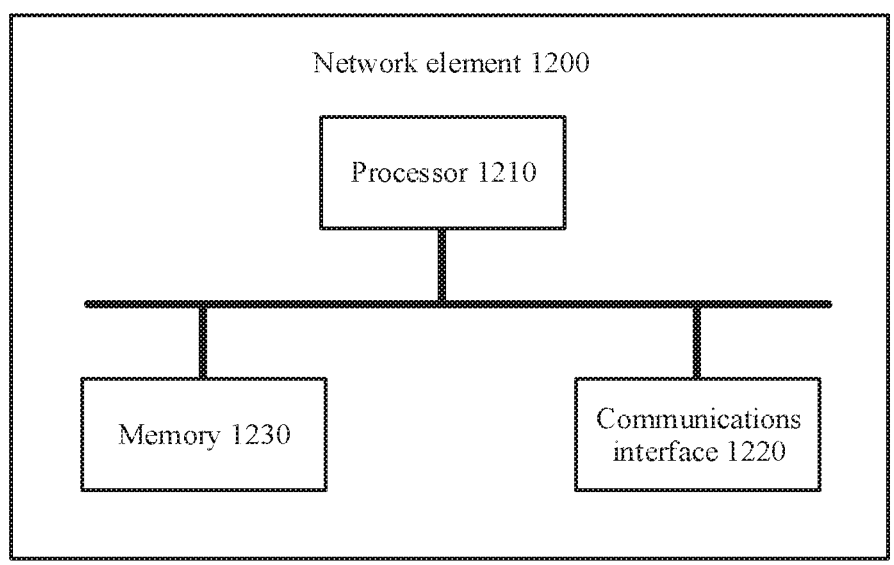
FIG. 12 is a schematic structural diagram of a network element according to another embodiment of this application.

FIG. 12 is a schematic block diagram of a network element 1200 according to an embodiment of this application. It should be understood that the network element 1200 can perform all the steps performed by the first network element in the methods shown in FIG. 1 to FIG. 8. To avoid repetition, details are not described herein again. The network element 1200 includes:

a memory 1210, configured to store a program;
a communications interface 1220, configured to communicate with another device; and
a processor 1230, configured to execute a program in the memory 1210, where when the program is executed, the processor 1230 is configured to: receive, through the communications interface 1220, first indication information from a second network element, where the first indication information is used to indicate that a current condition supports establishment of a session of a first network for a terminal apparatus; obtain first quality of service QoS control information of a first session of the terminal apparatus after receiving the first indication information, where the first session is a session established by the terminal apparatus by using a second network; and send, through the communications interface 1220, the first QoS control information to the second network element.

Figure 13:
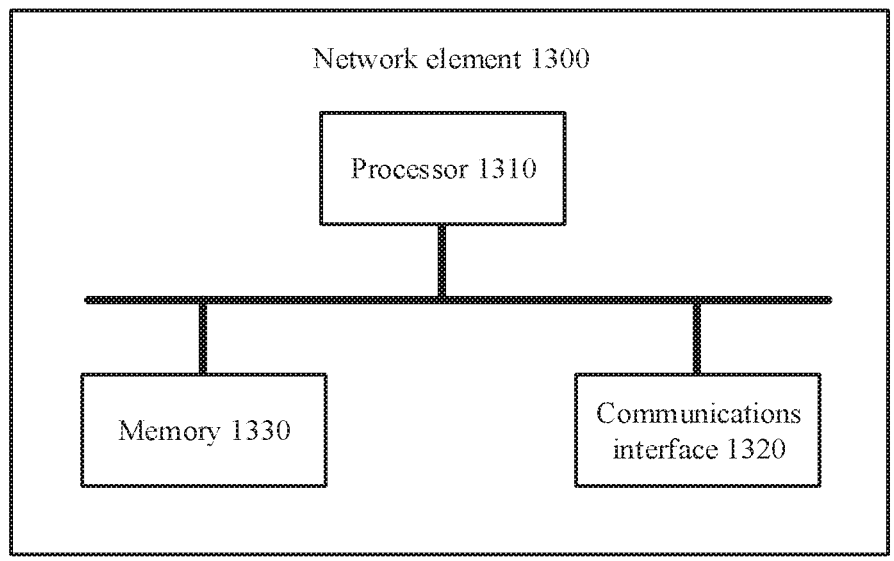
FIG. 13 is a schematic structural diagram of a network element according to another embodiment of this application.

FIG. 13 is a schematic block diagram of a network element 1300 according to an embodiment of this application. It should be understood that the network element 1300 can perform all the steps performed by the second network element in the methods shown in FIG. 1 to FIG. 8. To avoid repetition, details are not described herein again. The network element 1300 includes:

a memory 1310, configured to store a program: and a communications interface 1320, configured to communicate with another device; and
a processor 1330, configured to execute a program in the memory 1310, where when the program is executed, the processor 1330 is configured to: send, through the communications interface 1320, first indication information to a first network element, where the first indication information is used to indicate that a current condition supports establishment of a session of a first network for a terminal apparatus: and receive, through the communications interface 1320, first quality of service QoS control information of a first session of the terminal apparatus from the first network element, where the first session is a session established by the terminal apparatus by using a second network.

Figure 14:
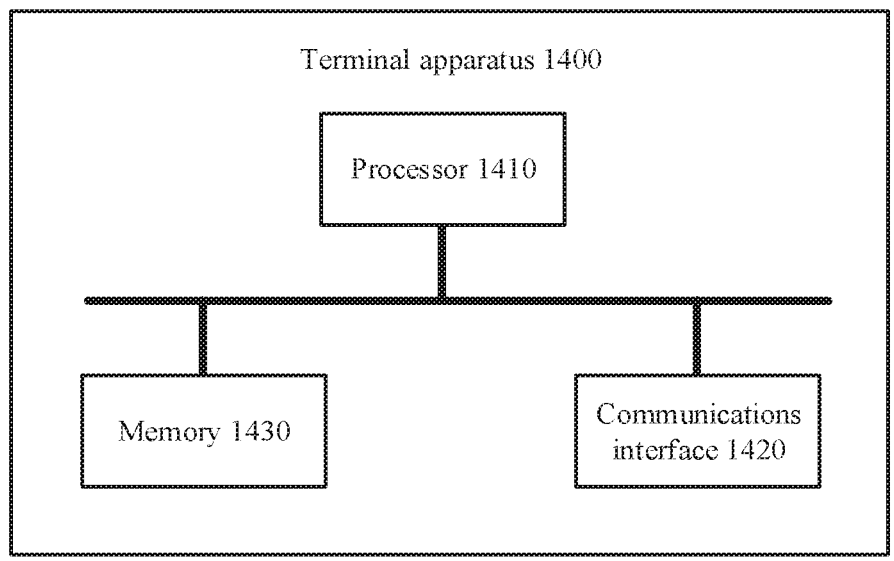
FIG. 14 is a schematic structural diagram of a terminal apparatus according to another embodiment of this application.

FIG. 14 is a schematic block diagram of a terminal apparatus 1400 according to an embodiment of this application. It should be understood that the terminal apparatus 1400 can perform all the steps performed by the terminal apparatus in the methods shown in FIG. 1 to FIG. 8. To avoid repetition, details are not described herein again. The terminal apparatus 1400 includes:

a memory 1410, configured to store a program:
a communications interface 1420, configured to communicate with another device; and
a processor 1430, configured to execute a program in the memory 1410, where when the program is executed, the processor 1430 is configured to: send, through the communications interface 1420, second indication information to a second terminal apparatus, where the second indication information is used to indicate that a current condition supports establishment of a session of a first network for a terminal apparatus: and receive, through the communications interface 1420, first quality of service QoS control information of a first session of the terminal apparatus, where the first session is a session established by the terminal apparatus by using a second network.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. A person skilled in the art may use a different method to implement the described function for each particular application, but it should not be considered that the implementation goes beyond the scope of this application.

It may be clearly understood by a person skilled in the art that, for the purpose of convenient and brief description, for a detailed working process of the system, apparatus, and unit described above, refer to a corresponding process in the foregoing method embodiments, and details are not described herein again.

In the several embodiments provided in this application, it should be understood that, the disclosed system, apparatus, and method may be implemented in another manner. For example, the apparatus embodiment described above is merely an example. For example, division into units is merely logical function division and may be another division manner in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions in the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form ofa software product. The software product of the computer is stored in a storage medium, and includes several instructions for instructing a computer device (which may be a personal computer, a server, or a network element) to perform all or some of the steps of the methods in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    receiving, by an access and mobility management function (AMF entity, a session establishment request to establish a session of a terminal apparatus in a 5G network;
    after receiving the session establishment request, sending, by the AMF entity to a first entity, a request message comprising indication information, wherein the indication information indicates that a communication interface exists between the AMF entity in the 5G network and a mobility management entity (MME) in a 4G network, or the indication information indicates that the 5G network supports interworking with a 4G network;
    obtaining, by the first entity according to the indication information, quality of service (QoS) control information of an evolved packet system (EPS) session in the 4G network;
    sending, by the first entity to the AMF entity, a response message corresponding to the request message, wherein the response message comprises the QoS control information of the EPS session in the 4G network; and
    sending, by the AMF entity to the terminal apparatus, the QoS control information of the EPS session in the 4G network.

2. The communication method according to claim 1, wherein the obtaining the QoS control information of the EPS session comprises:
    receiving, by the first entity, the QoS control information of the EPS session from a policy control function+policy and charging rule function (PCF+PCRF) entity.

3. The communication method according to claim 1, wherein the QoS control information of the EPS session comprises at least one of the following:
    a QoS parameter, an identifier of the QoS parameter, a packet filter, or priority information of the packet filter.

4. The communication method according to claim 1, wherein the QoS control information of the EPS session further comprises an EPS bearer ID.

5. The communication method according to claim 1, wherein the QoS control information of the EPS session comprises:
    a QoS parameter of a default EPS bearer of the terminal apparatus, or
    a QoS parameter of a dedicated EPS bearer of the terminal apparatus.

6. The communication method according to claim 1, wherein the first entity is a session management function+packet data unit control plane gateway (SMF+PGW-C) entity.

7. The communication method according to claim 6, wherein the SMF+PGW-C entity is configured to provide functions in the 5G network and the 4G network.

8. The communication method according to claim 7, wherein the functions in the 5G network and the 4G network comprise an EPS session management function and a 5G session management function.

9. The communication system according to claim 8, wherein the first entity is a SMF+PGW-C entity.

10. The communication method according to claim 9, wherein the SMF+PGW-C entity is configured to provide functions in the 5G network and the 4G network.

11. The communication method according to claim 10, wherein the functions in the 5G network and the 4G network comprise an EPS session management function and a 5G session management function.

12. A communication system, comprising:
    an access and mobility management function (AMF) entity and a first entity, wherein:
    the AMF entity is configured to:
        receive a session establishment request to establish a session of a terminal apparatus in a 5G network; and
        after receiving the session establishment request, send, to the first entity, a request message comprising indication information, wherein the indication information indicates that a communication interface exists between the AMF entity in the 5G network and a mobility management entity (MME) in a 4G network, or the indication information indicates that the 5G network supports interworking with a 4G network;
    the first entity is configured to:
        receive the request message;
        according to the indication information, obtain quality of service (QoS) control information of an evolved packet system (EPS) session in the 4G network; and
        send, to the AMF entity, a response message corresponding to the request message, wherein the response message comprises the QoS control information of the EPS session in the 4G network; and
    the AMF entity is further configured to:
        receive the response message from the first entity; and
        send, to the terminal apparatus, the QoS control information of the EPS session in the 4G network.

13. The communication system according to claim 12, wherein the QoS control information of the EPS session comprises at least one of the following: a QoS parameter, an identifier of the QoS parameter, a packet filter, or priority information of the packet filter.

14. The communication system according to claim 12, wherein the QoS control information of the EPS session further comprises an EPS bearer ID.

15. The communication system according to claim 12, wherein the QoS control information of the EPS session comprises:
  a QoS parameter of a default EPS bearer of the terminal apparatus, or
  a QoS parameter of a dedicated EPS bearer of the terminal apparatus.

\* \* \* \* \*

UNITED STATES PATENT AND TRADEMARK OFFICE
CERTIFICATE OF CORRECTION

PATENT NO. : 11,558,783 B2  
APPLICATION NO. : 16/864385  
DATED : January 17, 2023  
INVENTOR(S) : Yizhuang Wu and Chunshan Xiong It is certified that error appears in the above-identified patent and that said Letters Patent is hereby corrected as shown below:

In the Claims

In Column 32 Line 30 – in Claim 9, delete "8", and insert --12--.

In Column 32 Line 31 – in Claim 9, delete "SMF+PGW-C", and insert --session management function+packet data unit control plane gateway (SMF+PGW-C)--.

In Column 32 Line 32 – in Claim 10, delete "method", and insert --system--.

In Column 32 Line 35 – in Claim 11, delete "method", and insert --system--.

Signed and Sealed this  
Twenty-eighth Day of February, 2023

Katherine Kelly Vidal  
*Director of the United States Patent and Trademark Office*